US012465932B2

(12) United States Patent
Leveille et al.

(10) Patent No.: US 12,465,932 B2
(45) Date of Patent: *Nov. 11, 2025

(54) SPRAYER ASSEMBLY FOR DESI APPLICATIONS

(71) Applicant: Waters Technologies Corporation, Milford, MA (US)

(72) Inventors: Wade P. Leveille, Douglas, MA (US); Joseph D. Michienzi, Plainville, MA (US); Jeffrey Musacchio, Sharon, MA (US); Emrys Jones, Manchester (GB); Steven Derek Pringle, Darwen (GB); Stephen Hattan, Lowell, MA (US); Gregory T. Roman, North Scituate, RI (US)

(73) Assignee: Waters Technologies Corporation, Milford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/467,937

(22) Filed: Sep. 15, 2023

(65) Prior Publication Data

US 2024/0033756 A1 Feb. 1, 2024

Related U.S. Application Data

(63) Continuation of application No. 17/155,462, filed on Jan. 22, 2021, now Pat. No. 11,794,200.

(Continued)

(30) Foreign Application Priority Data

Sep. 10, 2020 (GB) ..................................... 2014233

(51) Int. Cl.
*B05B 5/03* (2006.01)
*B05B 12/32* (2018.01)

(52) U.S. Cl.
CPC ................ *B05B 5/03* (2013.01); *B05B 12/32* (2018.02)

(58) Field of Classification Search
None
See application file for complete search history.

(56) References Cited

U.S. PATENT DOCUMENTS 3,991,916 A 11/1976 Del Bon
5,582,347 A * 12/1996 Knobbe ................. B05B 15/55 239/707

(Continued)

FOREIGN PATENT DOCUMENTS

WO 2012062600 A1 5/2012
WO 2014197665 A2 12/2014

(Continued)

OTHER PUBLICATIONS

International Search Report and Written Opinion issued in International Application No. PCT/IB2021/050501 dated Jun. 10, 2021.

(Continued)

*Primary Examiner* — Jethro M. Pence
(74) *Attorney, Agent, or Firm* — WOMBLE BOND DICKINSON (US) LLP; Deborah M. Vernon; Mark R. Deluca

(57) ABSTRACT

A sprayer assembly for an ion source is disclosed. The sprayer includes a capillary having an outlet, a sheath for the capillary, and an elastic member. The sheath can move relative to the capillary between a first position in which the sheath covers the outlet of the capillary and a second position in which the outlet of the capillary is exposed. When the sheath moves from the first position to or towards the second position, the elastic member provides a restoring force that acts to restore the position of the sheath to or towards the first position.

15 Claims, 18 Drawing Sheets

Related U.S. Application Data

(60) Provisional application No. 63/071,081, filed on Aug. 27, 2020, provisional application No. 62/965,268, filed on Jan. 24, 2020.

(56) References Cited

U.S. PATENT DOCUMENTS

| | | | | |
|---|---|---|---|---|
| 5,868,322 | A | 2/1999 | Loucks, Jr. et al. | |
| 5,904,294 | A * | 5/1999 | Knobbe | B05B 5/032 239/105 |
| 6,003,794 | A * | 12/1999 | Hartman | B05B 5/03 239/695 |
| 6,138,922 | A * | 10/2000 | Hartman | B05B 7/0884 239/3 |
| 6,227,466 | B1 * | 5/2001 | Hartman | B05B 7/0884 239/707 |
| 7,820,935 | B2 | 10/2010 | Tverskoi et al. | |
| 10,451,594 | B2 | 10/2019 | Michienzi | |
| 10,627,375 | B2 * | 4/2020 | Robson | H01J 49/0431 |
| 10,978,287 | B2 * | 4/2021 | Fukui | H01J 49/0445 |
| 2005/0269518 | A1 | 12/2005 | Bajic et al. | |
| 2009/0256008 | A1 * | 10/2009 | Foster | B05B 7/005 239/589 |
| 2010/0059605 | A1 * | 3/2010 | Plantz | B01F 25/31243 239/316 |
| 2014/0047907 | A1 | 2/2014 | Murphy et al. | |
| 2014/0305801 | A1 | 10/2014 | Peterson et al. | |
| 2015/0165598 | A1 | 6/2015 | Cichon, Jr. | |
| 2018/0017534 | A1 | 1/2018 | Robson et al. | |
| 2018/0038829 | A1 | 2/2018 | Peterson et al. | |
| 2019/0299125 | A1 * | 10/2019 | Moeller | B32B 27/08 |
| 2020/0030833 | A1 | 1/2020 | Upper et al. | |
| 2020/0234940 | A1 | 7/2020 | Fukui | |

FOREIGN PATENT DOCUMENTS

| | | | |
|---|---|---|---|
| WO | 2016142694 | A1 | 9/2016 |
| WO | 2018189534 | A1 | 10/2018 |
| WO | 2019053849 | A1 | 3/2019 |
| WO | 2019053851 | A1 | 3/2019 |

OTHER PUBLICATIONS

Invitation to Pay Additional Fees and, Where Applicable, Protest Fee issued in International Application No. PCT/IB2021/050501 dated Apr. 20, 2021.

Search Report issued in UK Application No. 2014233.7 dated Mar. 4, 2021.

* cited by examiner

SPRAYER ASSEMBLY FOR DESI APPLICATIONS

CROSS-REFERENCE TO RELATED APPLICATION

This application is a continuation of U.S. application Ser. No. 17/155,462 filed on 22 Jan. 2021, which claims priority from and the benefit of U.S. provisional patent application No. 62/965,268 filed on 24 Jan. 2020, U.S. provisional patent application No. 63/071,081 filed on 27 Aug. 2020, and United Kingdom patent application No. 2014233.7 filed on 10 Sep. 2020. The entire contents of these applications are incorporated herein by reference.

FIELD OF THE INVENTION

The present invention relates generally to ion sources, and in particular to sprayer assemblies for ion sources.

BACKGROUND

Desorption electrospray ionisation ("DESI") is a form of ambient ionisation wherein a sprayer device acts to direct a spray of solvent droplets onto the surface of a sample that is to be analysed. The solvent droplets act to desorb analyte material from the surface of the sample. The analyte material that is liberated (desorbed) from the sample may then be collected and analysed by an analytical instrument, such as a mass and/or ion mobility spectrometer.

FIG. 1 shows a typical DESI sprayer 10. As shown in FIG. 1, the sprayer 10 comprises a solvent capillary 12 and a gas capillary 13. The solvent capillary 12 is arranged coaxially within the gas capillary 13, with the solvent-emitting outlet 12A of the solvent capillary 12 extending beyond the distal end of the gas capillary 13. A flow of solvent 14 supplied to the solvent capillary 12 is charged by means of a high voltage source 18, and is directed towards a sample 1 assisted by a nebulising gas flow 15 supplied to the gas capillary 13.

The resulting spray of (primary) electrically charged droplets 11 can desorb analyte material from the surface of the sample 1, and (secondary) droplets carrying desorbed ionised analyte may then travel via a transfer capillary 20 into an atmospheric pressure interface 22 of an analytical instrument (not shown), such as a mass and/or ion mobility spectrometer.

The Applicants have recognised that the solvent capillary 12 may be relatively fragile, and thus vulnerable to damage. An improved arrangement in which the solvent-emitting outlet 12A of the solvent capillary 12 is arranged behind a nozzle or shield has already been proposed by the Applicants in WO 2018/189534, the entire contents of which are incorporated herein by reference.

However, the inventors believe that there remains scope for improvements to ion sources, and to sprayer assemblies for ion sources.

SUMMARY

According to a first aspect, there is provided a sprayer assembly comprising:

a capillary having an outlet;

a sheath for the capillary; and an elastic member;

wherein the assembly is configured such that the sheath can move relative to the capillary between a first position in which the sheath covers the outlet of the capillary and a second position in which the outlet of the capillary is uncovered by the sheath; and wherein the assembly is configured such that when the sheath moves from the first position to or towards the second position, the elastic member provides a restoring force that acts to restore the position of the sheath to or towards the first position.

Various embodiments are directed to a sprayer assembly for an ion source, such as a desorption electrospray ionisation ("DESI") sprayer assembly. The assembly comprises a (solvent) capillary, and a sheath (a close fitting cover) for the capillary, which can act as a protective cover for the (relatively more fragile) capillary. The sheath can move relative to the capillary between a first position in which the sheath covers, and thus protects, a (solvent-emitting) outlet or tip of the capillary, and a second position in which the sheath does not cover the outlet (tip), for example in which the outlet is exposed (for normal use). The assembly further comprises an elastic member, such as a compression spring, which acts to bias the sheath towards the first position in which the outlet is covered (protected) by the sheath (in which the outlet is not exposed).

The inventors have recognised that while arranging the solvent capillary behind a nozzle, for example as described in WO 2018/189534, can provide protection to the capillary in normal use, it may be desired to remove the nozzle, for example in order to clean the nozzle, or in order to replace the nozzle with a different nozzle, for example that may have a different size and/or configuration. This can leave the capillary, and in particular the solvent-emitting tip of the capillary, exposed and vulnerable to damage. Moreover, the capillary may typically be a "consumable" item that is replaced relatively frequently, and so shipped and installed independently of protective elements such as the nozzle. As such, the capillary may be vulnerable to damage during transportation and installation. Furthermore, the solvent-emitting tip of the capillary may be relatively sharp, and so associated with a risk of injury.

By providing a sheath for the capillary, the capillary can be protected, for example during transportation and installation. Moreover, a risk of injury can be reduced. Furthermore, by biasing the position of the sheath relative to the capillary with an elastic member, the sheath can retract to expose the outlet to allow normal use, but then automatically extend to cover, and thus protect, the outlet, for example when the nozzle is removed.

It will be appreciated, therefore, that various embodiments provide an improved sprayer assembly for an ion source.

The assembly may be configured such that when the sheath moves from the first position to or towards the second position, the elastic member is elastically deformed.

The elastic member may be a spring, such as a compression spring. The assembly may be configured such that when the sheath moves from the first position to or towards the second position, the compression spring is compressed.

The compression spring may surround the capillary. The assembly may be configured such that the compression spring can be compressed between a collar provided on the capillary and (a shoulder within) the sheath.

The sheath may comprise a cavity, and the elastic member (compression spring) may be provided in the cavity within the sheath. This can retain and protect the elastic member, and can allow the capillary, sheath and elastic member to be provided together in the form of a cartridge.

The sheath may be formed from any suitable material, such as metal, and/or ceramics and/or plastics, such as PEEK (polyether ether ketone) or PPS (polyphenylene sulphide).

The sheath may be insulating. For example, the sheath may be formed from an insulating material, such as plastic, such as PEEK (polyether ether ketone) or PPS (polyphenylene sulphide). Additionally or alternatively, the sheath may have an insulating coating, for example a plastic coating. For example, the sheath may be formed from metal with an insulating coating.

The sheath may comprise one or more gas outlets configured to emit gas, for example such that the gas interacts with (nebulises) solvent emitted from the outlet of the capillary so as to generate a spray of solvent droplets.

The sheath may comprise one or more gas conduits. The one or more gas conduits may be configured so as to connect one or more gas inlets of the sheath to the one or more gas outlets. Nebulising gas may thus flow from the one or more gas inlets, through the one or more gas conduits, to the one or more gas outlets.

A gas conduit may be internal to the sheath, or formed in an exterior of the sheath.

The sheath may comprise an axial bore configured to retain the capillary, and the one or more gas conduits may each be arranged to be parallel to the axial bore.

The sheath may be formed as a single (integrated) part, or may be formed from plural parts. For example, the sheath may be formed from a main sheath body and an insert arranged within the main sheath body. The cavity may be formed in the main sheath body. The axial bore and the one or more gas conduits may be formed in the sheath insert.

The capillary may be formed from a metal, such as stainless steel.

The outlet of the capillary may be tapered. The outlet of the capillary may be configured to emit solvent (droplets).

The assembly may comprise a sprayer assembly body. The capillary, the sheath and the elastic member may be removably attachable to the body.

The capillary, the sheath and the elastic member may be configured as a cartridge, and the cartridge may be removably attachable to the body. The body may comprises a bore configured to receive the cartridge.

The assembly may further comprise a removable nozzle. The nozzle may be removably attachable to the body.

The nozzle may comprise an aperture. Solvent (droplets) emitted by the capillary may be arranged to pass through the aperture of the nozzle.

The assembly may be configured such that installing the nozzle causes the sheath to move to the second position, and removing the nozzle causes the sheath to move to the first position.

The assembly may be configured such that the cartridge (sheath) is retained within the body when the nozzle is attached to the body.

According to another aspect, there is provided a sprayer assembly comprising:

- a sprayer assembly body;
- a capillary having an outlet;
- a sheath for the capillary; and
- a nozzle that is removably attachable to the body;
- wherein the assembly is configured such that the sheath can move relative to the capillary between a first position in which the sheath covers the outlet of the capillary and a second position in which the outlet of the capillary is uncovered by the sheath (in which the sheath does not cover the outlet of the capillary); and
- wherein the assembly is configured such that attaching the nozzle to the body causes the sheath to move to the second position and removing the nozzle from the body causes the sheath to move to the first position.

The assembly according to this aspect may have any one or more or each of the optional features described herein in relation to other aspects, as appropriate.

The assembly according to this aspect may comprise an elastic member, and may be configured such that when the sheath moves from the first position to or towards the second position, the elastic member provides a restoring force that acts to restore the position of the sheath to or towards the first position.

In various aspects and embodiments, the assembly may be configured such that the nozzle pushes the sheath to the second position when the nozzle is attached to the body.

The assembly may be configured such that the sheath is retained in the second position when the nozzle is connected to the body.

The assembly may be configured such that the restoring force causes the sheath to move to or towards the first position when the nozzle is removed from the body.

The sheath may be configured to guide the nozzle into coaxial alignment with the capillary when the nozzle is attached to the body.

According to another aspect, there is provided a sprayer assembly comprising:

- a sprayer assembly body;
- a capillary;
- a guide configured to retain the capillary; and
- a nozzle that is removably attachable to the guide;
- wherein the guide is configured to guide the nozzle into coaxial alignment with the capillary when the nozzle is attached to the guide.

The assembly according to this aspect may have any one or more or each of the optional features described herein in relation to other aspects, as appropriate.

The inventors have recognised that the spray produced by a sprayer having a nozzle may be particularly sensitive to the alignment (centering) between the capillary and the nozzle, and accordingly that spray reproducibility can be improved by providing a nozzle guide.

The alignment (centering) may be such that (an aperture of) the nozzle is aligned (positioned in-line) (coaxially) with the (outlet of the) capillary.

The nozzle may comprise a bore configured to fit coaxially over the nozzle guide (sheath).

The capillary may be arranged to be coaxial with the nozzle guide (sheath), for example retained in a central axial bore of the nozzle guide (sheath), and the nozzle aperture may be arranged to be coaxial with the nozzle bore, for example on a central axis of the nozzle.

An outlet end of the nozzle guide (sheath) may have a conical or frustoconical shape, and an inner surface of the nozzle bore may have a complimentary conical or frustoconical shape.

The nozzle may be removably attachable to the guide by a screw or bayonet fitting.

The inventors have recognised that the spray produced by a sprayer having a nozzle may be particularly sensitive to the distance between the aperture of the nozzle and the outlet of the capillary. It has furthermore been recognised that the use of a bayonet fitting can reduce variability in this distance, and accordingly that spray reproducibility can be improved by using a bayonet fitting.

The bayonet fitting may comprise a connector body and one or more tabs. The body may comprise one or more grooves arranged to receive the one or more tabs.

The sprayer assembly may be configured such that the distance between the nozzle aperture and the capillary outlet is adjustable, such as being controllably adjustable. Some or all of a rear surface of the connector body may be sloped, inclined and/or curved.

The assembly may comprise a nozzle assembly comprising the nozzle and the screw or bayonet fitting, wherein the nozzle is removable from the screw or bayonet fitting.

The nozzle may be captive to the screw or bayonet fitting.

According to another aspect, there is provided a sprayer assembly comprising:

a sprayer assembly body;

a cartridge housing a capillary; and a nozzle that is removably attachable to the body;

wherein the assembly is configured such that the cartridge can be retained within the body (by the nozzle) when the nozzle is attached to the body.

The assembly according to this aspect may have one or more or each of the optional features described herein in relation to other aspects, as appropriate.

By providing a removable cartridge that houses the capillary, installation of the capillary can be made more straightforward and more user friendly, and the risk of damage to the capillary occurring during installation of the capillary can be reduced.

The body may comprise one or more supply ports. The assembly may be configured such that the one or more supply ports are coupled to one or more corresponding ports of the cartridge when the cartridge is retained within the body.

The body may comprise a solvent supply port. The body may comprise a gas supply port. The body may comprise a high voltage supply port.

The assembly may be configured such that the solvent supply port is coupled to the capillary when the cartridge is retained within and/or connected to the body.

The assembly may configured such that the gas supply port is coupled to the cartridge when the cartridge is retained within and/or connected to the body.

The assembly may configured such that the high voltage supply port is coupled to the cartridge when the cartridge is retained within and/or connected to the body.

The sprayer assembly may be configured to produce a spray of solvent droplets. The spray of solvent droplets may be suitable for desorbing analyte material from the surface of a sample.

According to an aspect, there is provided an ion source comprising a sprayer assembly as described above.

The ion source may further comprise a sampling inlet configured to collect analyte. The analyte may be produced as a result of a spray produced by the sprayer assembly interacting with a sample.

The sampling inlet may be connected to an analytical instrument, such as mass and/or ion mobility spectrometer.

According to another aspect, there is provided a method of producing a spray of droplets comprising producing a spray of droplets using the sprayer assembly described above.

According to another aspect, there is provided a method of ionising a sample comprising:

providing a sprayer assembly as described above; and directing a spray produced by the sprayer assembly towards a sample.

According to another aspect, there is provided a method of analysing a sample comprising:

providing a sprayer assembly as described above;

directing a spray produced by the sprayer assembly towards a sample to produce analyte; and analysing the analyte.

The analyte may comprise analyte ions. Additionally or alternatively, the analyte may be ionised to produce analyte ions.

Analysing the analyte may comprise analysing analyte ions to determine their mass to charge ratio and/or ion mobility, and/or to determine the mass to charge ratio and/or ion mobility of ions derived from the analyte ions (for example by fragmenting the analyte ions).

BRIEF DESCRIPTION OF THE DRAWINGS

Various embodiments will now be described, by way of example only, and with reference to the accompanying drawings in which.

DETAILED DESCRIPTION

Figure 1:
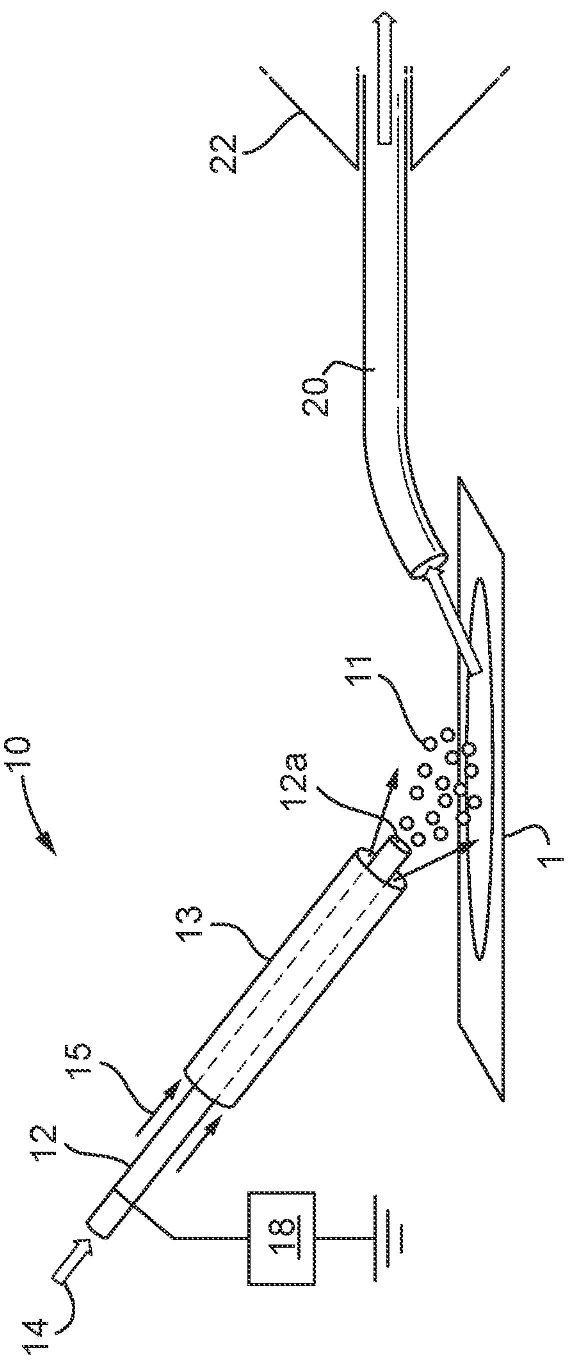
FIG. 1 shows a desorption electrospray ionisation ("DESI") ion source.

FIG. 1 shows a typical desorption electrospray ionisation ("DESI") ion source which includes a sprayer 10. As shown in FIG. 1, the sprayer 10 comprises a solvent capillary 12 and gas capillary 13. The solvent capillary 12 (emitter) is arranged coaxially within the gas capillary 13, with the solvent-emitting outlet or tip 12A of the solvent capillary 12 extending beyond the distal end of the gas capillary 13. A flow of solvent 14 supplied to the solvent capillary 12 is charged by means of a high voltage source 18, and is directed towards a sample 1, assisted by a nebulising gas flow 15 supplied to the gas capillary 13.

The resulting spray of (primary) electrically charged droplets 11 can desorb analyte material from the surface of the sample 1, and (secondary) droplets carrying desorbed ionised analytes may then travel via a transfer capillary 20 into an atmospheric pressure interface 22 of an analytical instrument (not shown), such as a mass and/or ion mobility spectrometer. The ions may then be analysed to determine their mass to charge ratio and/or ion mobility, and/or to determine the mass to charge ratio and/or ion mobility of ions derived from the initial ions (for example by fragmenting the initial ions).

The Applicants have recognised that the solvent capillary 12 may be relatively fragile (for example comprising fused silica), and thus vulnerable to damage.

Figure 2:
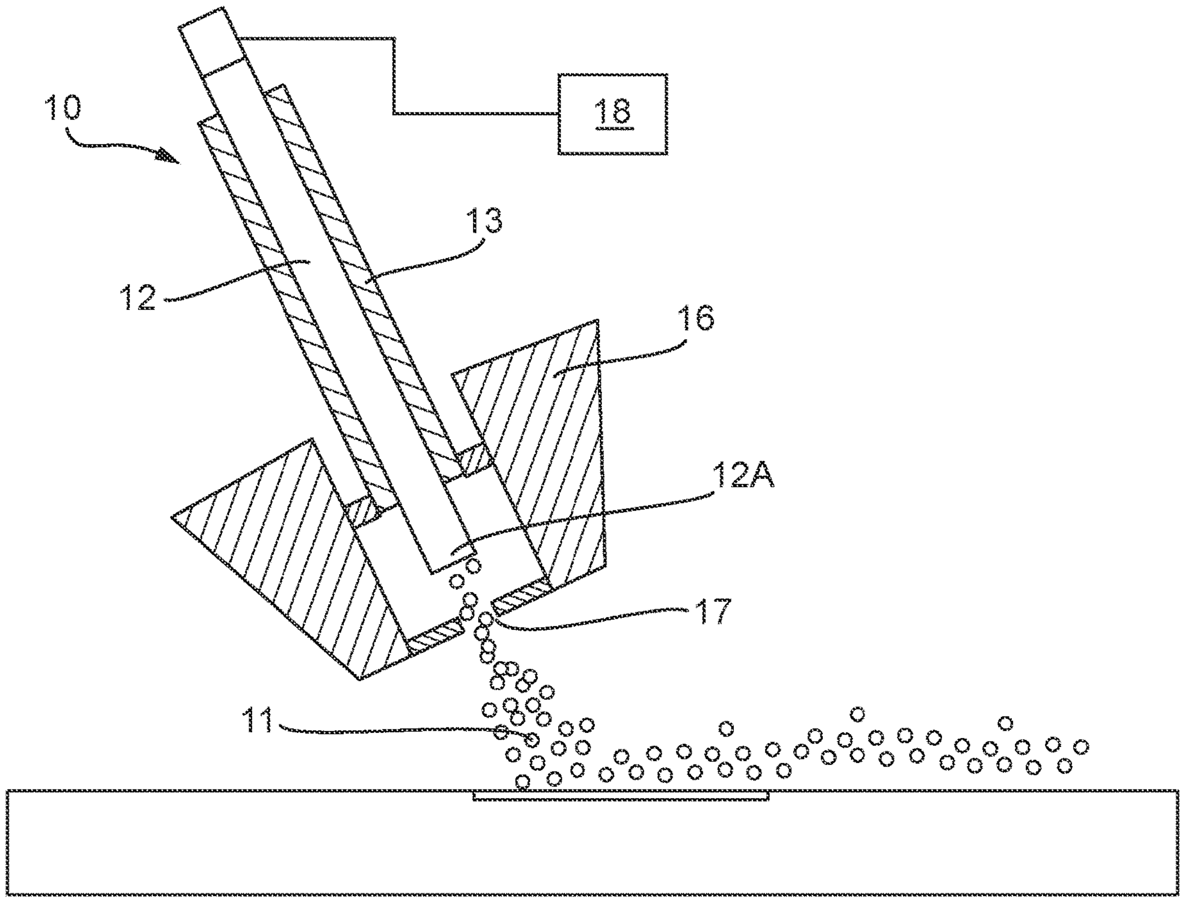
FIG. 2 shows a desorption electrospray ionisation ("DESI") sprayer having a nozzle.

FIG. 2 shows an alternative desorption electrospray ionisation ("DESI") sprayer arrangement wherein the outlet (tip) 12A of the solvent capillary 12 is located behind a nozzle (nose cone or shield) 16, with the solvent capillary 12 located in-line with an aperture 17 provided in the nozzle 16 such that the solvent spray 11 is directed from the solvent capillary 12 through the aperture 17 onto the sample surface.

As discussed in WO 2018/189534, the nozzle 16 may act to protect the solvent capillary 12 in use. The aperture 17 may also provide some focusing of the solvent spray 11.

As discussed above, the inventors have recognised that while the nozzle 16 can provide protection to the solvent capillary 12 in normal use, it may be desirable to remove the nozzle 16, for example for maintenance/cleaning or to replace the nozzle with a different sized nozzle, thereby leaving the solvent capillary 12 vulnerable to damage. Moreover, the solvent capillary may be vulnerable to damage during transportation and installation.

The inventors have furthermore recognised that in arrangements having a nozzle 16, it is necessary to very precisely align the outlet 12A of the solvent capillary 12 with the aperture 17 of the nozzle 16 in order to achieve consistent performance.

In various embodiments, a sprayer assembly comprising a "sleeve" or sheath (that is, a close fitting cover) for the (solvent) capillary is provided. The sheath (sleeve) can move relative to the capillary between a first protective position in which the sheath covers the (solvent-emitting) outlet (tip) of the capillary, and a second exposed position in which the outlet (tip) is exposed (that is, not covered by the sheath) for normal use. An elastic member, such as a compression spring, provides a restoring force which acts to restore the position of the sheath to the protective position, when the sheath moves away from the protective position to or towards the exposed position.

In various embodiments, as will be discussed further below, installing the nozzle causes the sheath to move to the second exposed position, and when the nozzle is removed, the restoring force provided by the elastic member (compression spring) causes the sheath to return to the first protective position.

Thus, in various embodiments, a spring loaded sheath is provided which can protect the solvent capillary, for example when the nozzle is removed.

In various embodiments, as will be discussed further below, the sheath is furthermore configured such that when the nozzle is installed, the outlet of the solvent capillary is aligned with the aperture of the nozzle.

FIGS. 3A-E illustrate a desorption electrospray ionisation ("DESI") sprayer assembly according to various embodiments. The assembly of FIG. 3 is in the form of a cartridge 30 that includes a solvent capillary 32 surrounded by a sheath 31, and an elastic member in the form of a compression spring 33.

Figure 3A:
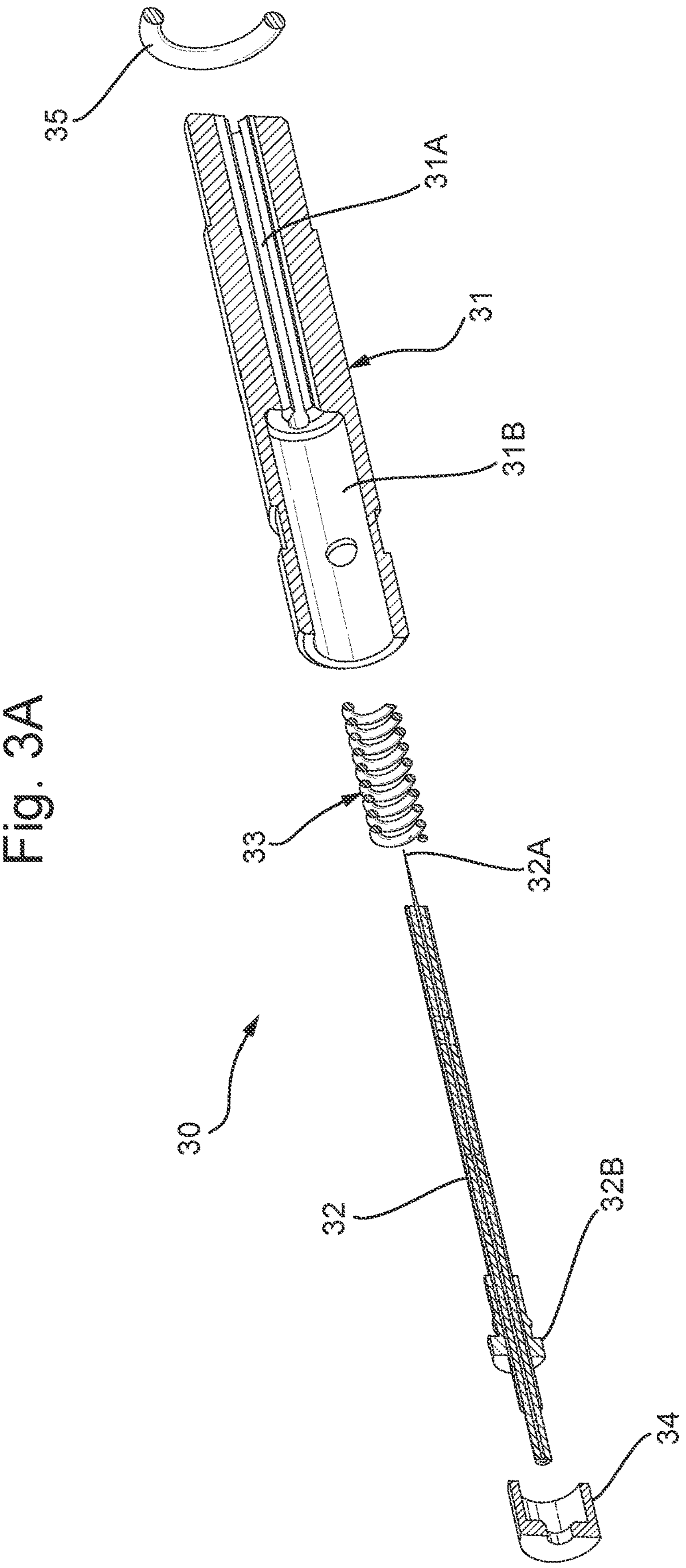
FIG. 3A is an exploded view of a sprayer cartridge assembly according to various embodiments.
Figure 3B:
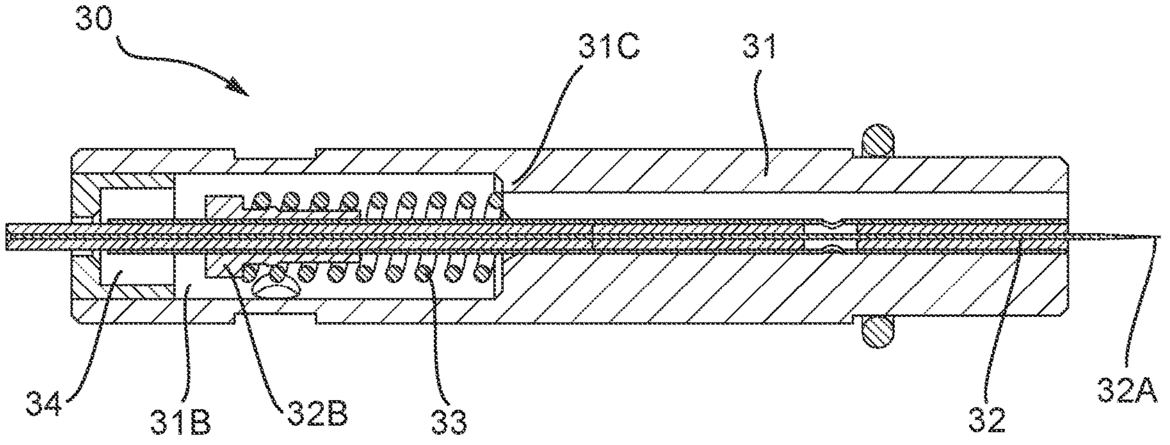
FIG. 3B is a cross-section view of a sprayer cartridge assembly according to various embodiments.
Figure 3C:
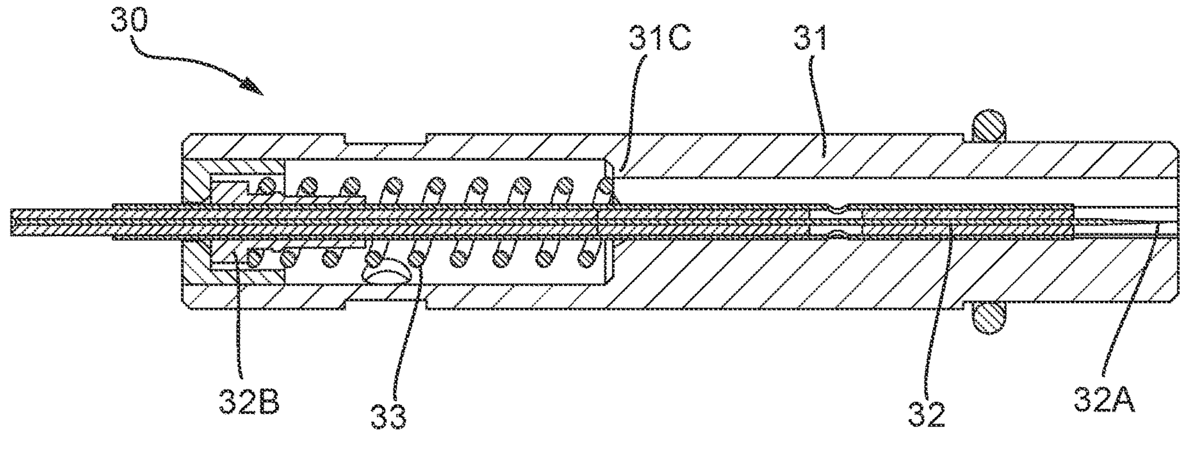
FIG. 3C is a cross-section view of a sprayer cartridge assembly according to various embodiments.
Figure 3D:
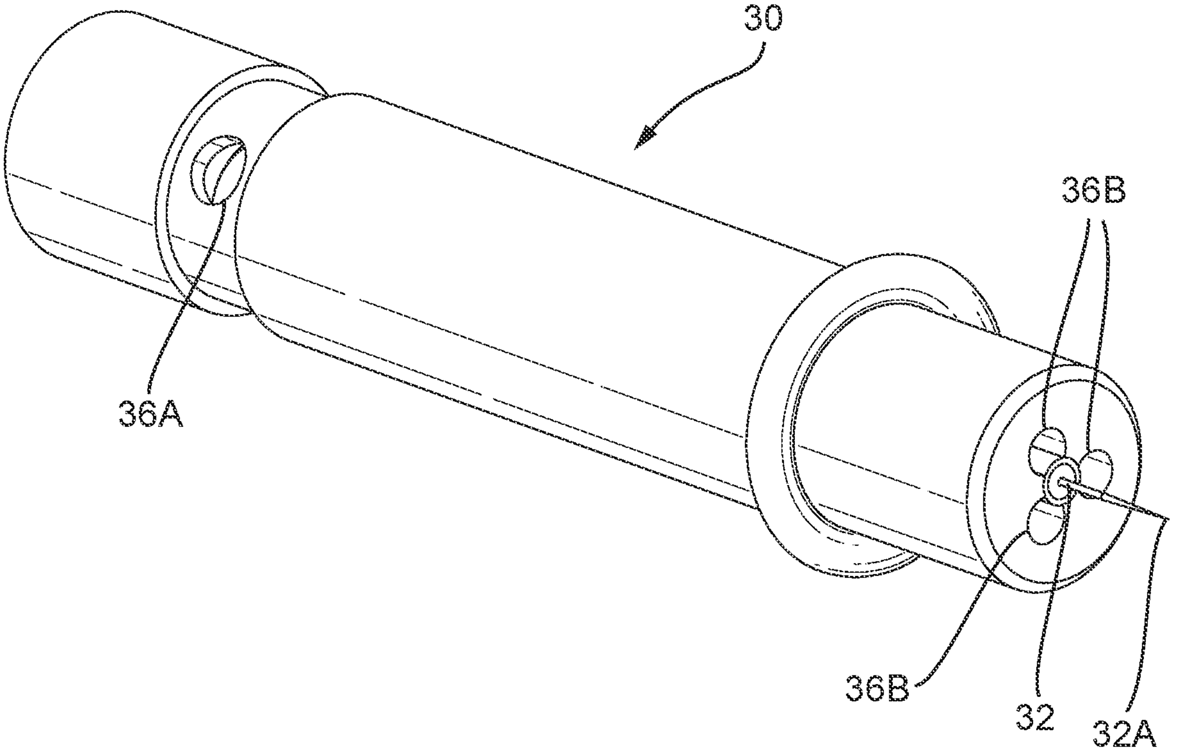
FIG. 3D is a perspective view of a sprayer cartridge assembly according to various embodiments.
Figure 3E:
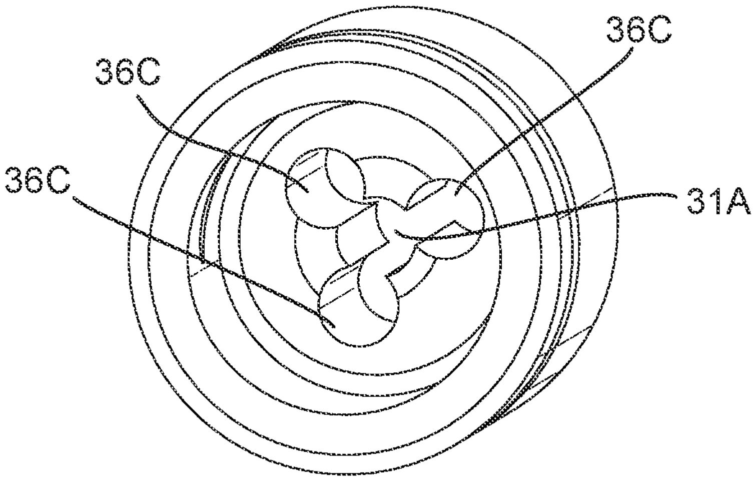
FIG. 3E is an internal view of a sprayer cartridge assembly according to various embodiments.

FIG. 3A is an exploded view of the assembly, FIG. 3B shows the sheath 31 positioned relative to the capillary 32 such that the outlet (solvent-emitting tip) 32A of the capillary is exposed for normal use, FIG. 3C shows the sheath 31 in the protective position in which the outlet (tip) 32A is covered by the sheath 31 and thereby protected from damage, FIG. 3D is a perspective view of the assembly in the exposed position, and FIG. 3E shows an internal view of the sheath 31.

The capillary 32 may be supplied with, and emit, a solvent, and so may be referred to as a solvent or spray capillary, or an emitter. The capillary 32 may be generally tubular, with solvent being supplied at one axial (solvent-receiving) (inlet) end, and being emitted at the opposite axial end, that is at the outlet (or solvent-emitting tip) 32A. The outlet (solvent-emitting tip) 32A of the capillary may be tapered.

The capillary 32 may be formed from any suitable material, such as fused silica. In embodiments, the capillary 32 is formed of an electrically conductive (metallic) material, such as stainless steel. The inventors have found that an electrically conductive capillary can reduce or avoid electrical charge build up, which could otherwise result in undesirable electric fields. Moreover, while a metal (for example stainless steel) solvent capillary 32 may be less brittle than, for example fused silica, it may still benefit from a protective sheath, for example due to the risk of bending.

Liquid solvent may be provided to the capillary 32 at a solvent flow rate of, for example, between about 0.05 and 10 μL/min. In embodiments, the solvent flow rate may be between about 1 and 4 μL/min, such as between about 2 and 3 μL/min, or about 2 μL/min.

The solvent may comprise any suitable and desired solvent. For example, the solvent may comprise an organic solvent such as acetonitrile. As another example, the solvent may comprise methanol. Other suitable solvents may include dichloromethane (optionally mixed with methanol), dichloroethane, tetrahydrofuran, ethanol, propanol, nitromethane, toluene (optionally mixed with methanol or acetonitrile), or water. The solvent may further comprise an acid such as formic or acetic acid. The solvent may further comprise one or more additives.

The solvent droplets may be charged. Thus, a voltage may be applied to the sprayer assembly in order to charge the solvent and/or the solvent droplets. For example, a voltage between about 0 and 5 kV may be applied to the capillary 32 or solvent in order to charge the solvent droplets. In embodiments, voltages between about 2 and 3 kV, such as a voltage of about 2.5 kV, may be applied to the capillary 32 or solvent. In embodiments, a voltage between about 1 and 5 kV, such as between about 1 and 3 kV, such as a voltage of about 1 kV, is applied to the capillary 32 or solvent.

In embodiments, a voltage between about 1 and 5 kV is applied to the capillary 32 or solvent, where the liquid solvent is provided to the capillary 32 at a flow rate of between about 2 and 3 μL/min.

The sheath 31 may be generally configured as a close fitting (protective) cover for the capillary 32. The sheath 31 may be configured to (at least partially) coaxially surround the capillary 32. The sheath 31 may be configured such that the sheath 31 can slide over the capillary 32 to move relative to the capillary 32 between the (first) protective and (second) exposed positions.

In embodiments, the (axial) length of the sheath 31 is such that the sheath can cover a substantial portion (most) of the capillary 32, such as at least 30%, at least 40%, at least 50%, at least 60%, at least 70%, at least 80%, or at least 90% of the (axial) length of the capillary. The inventors have found that longer sheath lengths can improve capillary alignment.

As can be seen in FIGS. 3B and 3C, the (axial) length of the sheath 31 may be such that when the sheath is in the (first) protective position and when the sheath is in the (second) exposed position, the solvent-receiving end (the inlet) of the capillary 32 is exposed (not covered by the sheath 31), so as to allow convenient coupling to the solvent supply.

The sheath 31 may be formed of any suitable material. The sheath 31 may be formed of a material which is relatively less fragile, that is less vulnerable to breaking or bending, than the capillary, so that the sheath can protect the capillary from damage. In embodiments, the sheath is formed from metal, and/or ceramics and/or plastics, such as PEEK (polyether ether ketone) or PPS (polyphenylene sulphide).

The sheath 31 may be electrically insulating. For example, the sheath 31 may be formed from an electrically insulating material and/or comprise an electrically insulating coating. Forming an electrically insulating sheath 31 means that the sheath can (also) function as an insulator for a conducting (metal) capillary.

As can be seen in FIGS. 3A-E, the sheath 31 may be generally cylindrical, and may be hollow, that is, may have a generally tubular shape.

The sheath 31 may have an axial bore, which may be configured and dimensioned to receive the capillary 32 therein. The capillary-receiving axial bore of the sheath 31 may be generally cylindrical, and may run centrally along the (entire) axial length of the sheath 31. Providing the capillary-receiving axial bore of the sheath 31 centrally within the sheath can help with alignment of the capillary 32 relative to other components of the assembly, such as relative to the nozzle (not shown in FIG. 3).

As can be seen in FIGS. 3A-E, at least part 31A of the axial bore may be configured and dimensioned to retain the capillary 32, such that when installed within the axial bore, the capillary 32 is retained (held) by the sheath 31 (and appropriately aligned with the other components of the assembly). Thus, some or all of the (length of the) axial bore may have a first diameter which may be slightly larger than the diameter of the capillary 32 (for example with a tight clearance, such as around 0.1 mm), such that, when installed within the axial bore, the capillary 32 is held by the sheath 31 (and appropriately aligned with the other components of the assembly).

It would be possible for the axial bore to have the same diameter along the entire length of the sheath 31, in which case, the axial bore may have the first diameter along its entire length. However, in various embodiments, the axial bore has multiple different diameters along the length of the sheath 31. In this case, the axial bore may have at least one axial segment 31A that has the first diameter (so that the capillary 32 is held by the sheath 31), but may have one or more other segments 31B having a diameter greater than the first diameter.

For example, in various embodiments, the axial bore comprises a first axial segment 31A which has the first diameter (and which may be located at the end of the sheath proximate to the capillary outlet 32A), and a second axial segment or cavity 31B which may have second diameter that is larger than the first diameter (and which may be located at the other end of the sheath).

As can be seen in FIGS. 3A-C, in embodiments, the restoring force may be provided by a compression spring 33. However, it is contemplated that other elastic members could be used to provide the restoring force. The elastic member (compression spring 33) may thus act to bias the position of the sheath 31 relative to the capillary 32 towards the protective position in which the solvent-emitting tip (outlet) 32A of the capillary 32 is protected by the sheath 31.

The assembly can be configured such that the elastic member (compression spring 33), provides a restoring force between the capillary 32 and sheath 31 in any suitable manner. In embodiments, the elastic member is arranged and configured such that when the sheath 31 moves relative to the capillary 32 from the first exposed position to or towards the second protective position, the elastic member is elastically deformed, for example compressed, such that it provides the restoring force.

For example, as can be seen in FIGS. 3A-C, the compression spring 33 may surround the capillary 32. A collar 32B may be provided on the capillary, a shoulder 31C may be formed within the sheath 31, and the compression spring 33 may be compressed between the collar 32B and the shoulder 31C. As shown in FIG. 3B, in the exposed position, the compression spring 33 may be under compression between the collar 32B provided on the capillary 32 and the shoulder 31C in the sheath 31. As can be seen in FIG. 3C, the compression spring 33 may be unloaded in the protective position.

In embodiments, the second axial segment or cavity 31B of the sheath 31 may be configured to receive the elastic member (compression spring 33). An end cap 34 may be configured to close the cavity 31B so as to retain the elastic member 33 (and capillary 32) within the sheath 31. Providing the elastic member within a cavity 31B of the sheath can protect the elastic member from damage. Moreover, this arrangement can enable the sheath 31, capillary 32 and elastic member 33 to be conveniently provided together as a cartridge assembly 30.

The assembly may be supplied with a flow of nebulising gas. The assembly may be configured such that the flow of nebulising gas interacts with (nebulises) solvent emitted at the outlet (solvent-emitting tip) 32A of the capillary 32 to generate a spray of solvent droplets. The nebulising gas may suitably be provided at a pressure between about 0.1 and 10 bar, such as between about 0.2 and 5 bar, such as between about 3 and 5 bar, such as about 4 bar, or between about 0.5 and 2 bar. The nebulising gas can be any suitable gas, such as nitrogen.

The assembly may further comprise a gas capillary that may surround the solvent capillary 32, with the nebulising gas being supplied to the gas capillary. However, in embodiments, the sheath 31 acts as a nebulising gas conduit for the assembly.

Thus, as can be most clearly seen in FIG. 3D, in embodiments, the sheath may comprise one or more gas inlets 36A configured to receive a flow of (nebulising) gas. The one or more gas inlets 36A may comprise one or more gas receiving apertures arranged in a side wall of the sheath 31, and may be arranged and configured such that gas may enter the second axial segment or cavity 31B within the sheath via the one or more gas inlets 36A. The sheath may also comprise one or more gas outlets 36B (such as one or more gas emitting apertures) configured to emit the received gas such that the gas interacts with (nebulises) solvent emitted at the outlet (solvent-emitting tip) 32A of the capillary 32 so as to generate a spray of solvent droplets.

As can be best seen in FIG. 3E, in embodiments, the sheath 31 may comprise one or more gas conduits 36C connecting the one or more gas inlets 36A to the one or more gas outlets 36B (via the second axial segment or cavity 31B). Integrating sheath and gas conduit functions in this manner provides a simpler assembly.

The one or more gas conduits 36C can be configured as desired. As can be seen in FIG. 3E, in embodiments, each gas conduit 36C may run along at least a portion of the axial length of the sheath 31, such as along the length of and parallel with the (first axial segment 31A of the) capillary-receiving axial bore. A (each) gas conduit can be any shape, such as generally cylindrical.

In embodiments, as can be seen in FIG. 3E, the one or more axial gas conduits 36C may each be radially displaced from the central axis of the sheath 31 by the same or a similar radial distance, such that the (first axial segment 31A of the) central bore and gas conduits 36C may together form a single connected cavity within the sheath 31.

In embodiments, there are plural gas conduits 36C that are spaced equally apart. The (first axial segment 31A of the) central bore may thus be defined by radially inwardly protruding portions of the sheath between the plural gas conduits 36C, which may be configured to retain the capillary 32 centrally within the sheath 31.

While in the embodiment of FIG. 3E, the central bore and gas conduits 36C together form a single connected cavity within the sheath 31, in further embodiments one or more or each of the central bore and gas conduits 36C may be separate (may each comprise a separate bore (cavity) within the sheath 31). In these embodiments, one or more or each of the central bore and gas conduits 36C may be separated by (internal) wall(s) of the sheath 31.

While the embodiment of FIG. 3E has three gas conduits 36C, it is contemplated that fewer than or more than three gas conduits may be provided. For example, the sheath 31 may comprise one, two, three, four, five, six, seven, eight or more gas conduits 36C.

While in the embodiment of FIG. 3E, the gas conduits 36C are internal to the sheath 31, it is contemplated that gas conduits may be provided as channels in an external surface of the sheath. In this case, a gas flow passage may be defined between an exterior surface of the sheath and a body or manifold that the sheath is installed in.

In various embodiments, the assembly is provided as a replaceable (removable) cartridge. For example, as shown in FIG. 3, the assembly may be a replaceable cartridge assembly 30 comprising the solvent capillary 32, sheath 31 and elastic member 33. In these embodiments, installing the solvent capillary into an analytical instrument may comprise installing the cartridge assembly 30 as a single unit into the analytical instrument. This means that the solvent capillary can be protected by the sheath during installation.

Figure 4A:
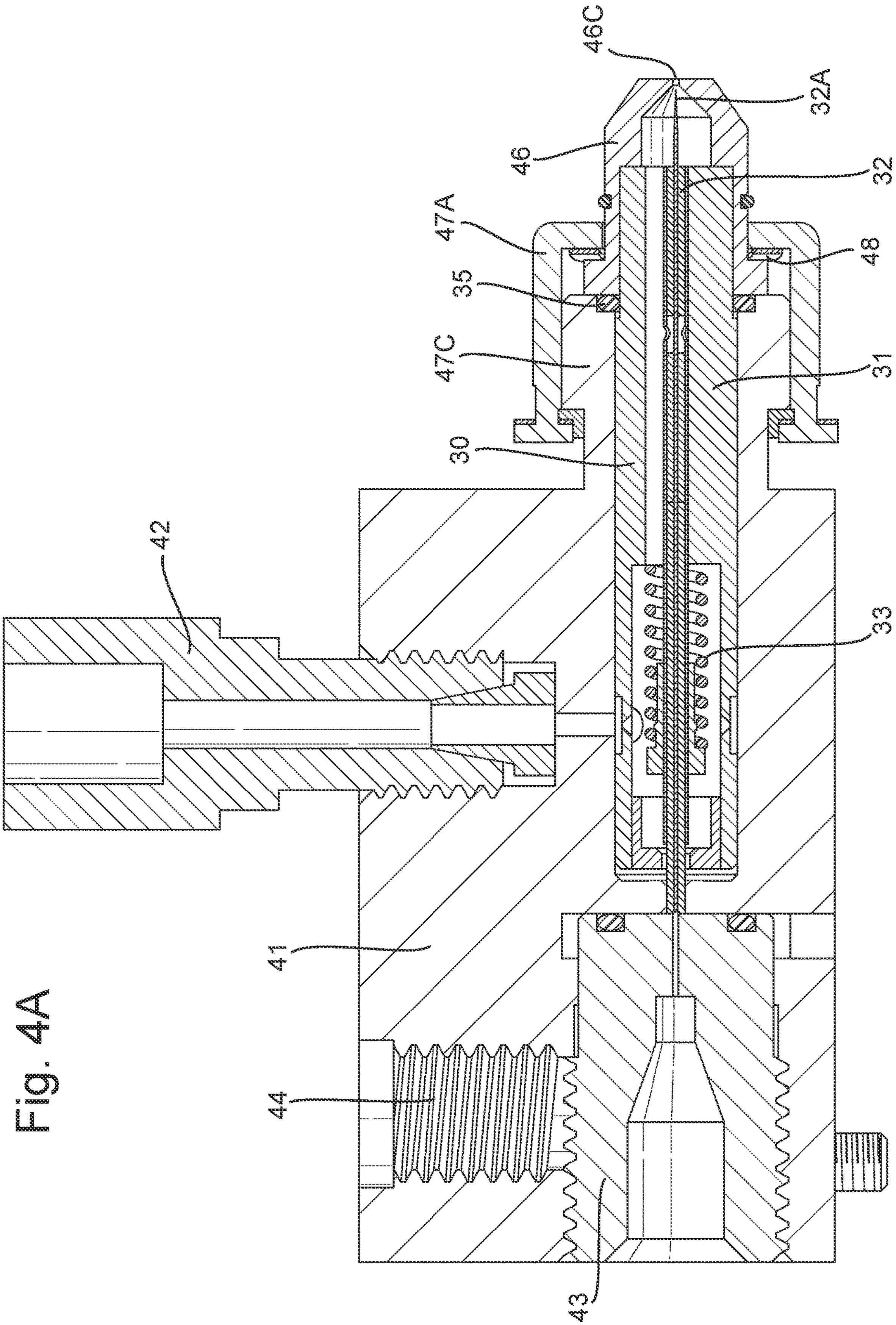
FIG. 4A shows a sprayer assembly comprising the sprayer cartridge assembly of FIG. 3 installed for use according to various embodiments.

FIG. 4A shows a cartridge assembly 30 installed for use into a body or manifold 41 of an analytical instrument, according to various embodiments. The manifold (body) 41 may be machined from a suitable material, for example metal, and/or ceramics and/or plastics, such as PEEK (polyether ether ketone) or PPS (polyphenylene sulphide). In these embodiments, the cartridge 30 may be configured to slide into a bore within the body 41, and may be retained there by connecting a nozzle 46 to the body 41. As can be seen in FIG. 4A, in the installed position, the sheath 31 may be positioned in the exposed position, such that the outlet (solvent-emitting tip) 32A of the capillary 32 is not covered by the sheath 31. Accordingly, in the installed position, the compression spring 33 is under compression.

As can be seen in FIGS. 3A-D and 4A, the cartridge assembly 30 may further comprise one or more O-ring seals 35 for providing a seal when the cartridge assembly 30 is installed in the manifold body 41.

The body 41 may be configured such that when the cartridge assembly is installed in the bore, the cartridge assembly 30 is coupled to a gas input fitting 42 and a solvent input fitting 43. The manifold body 41 may be further configured such that when the cartridge assembly is installed in the bore, a high voltage supply is coupled to the solvent flow, for example via a high voltage port 44.

Thus, when the cartridge assembly 30, gas fitting 42 and solvent inlet fitting 43 are installed in the manifold body 41, a gas flow may be received by the one or more gas inlets 36A of the sheath 31, and a solvent flow may be received by the inlet (solvent-receiving end) of the solvent capillary 32. Furthermore, a high voltage may be received from the high voltage port 44 for applying to the solvent.

Figure 4B:
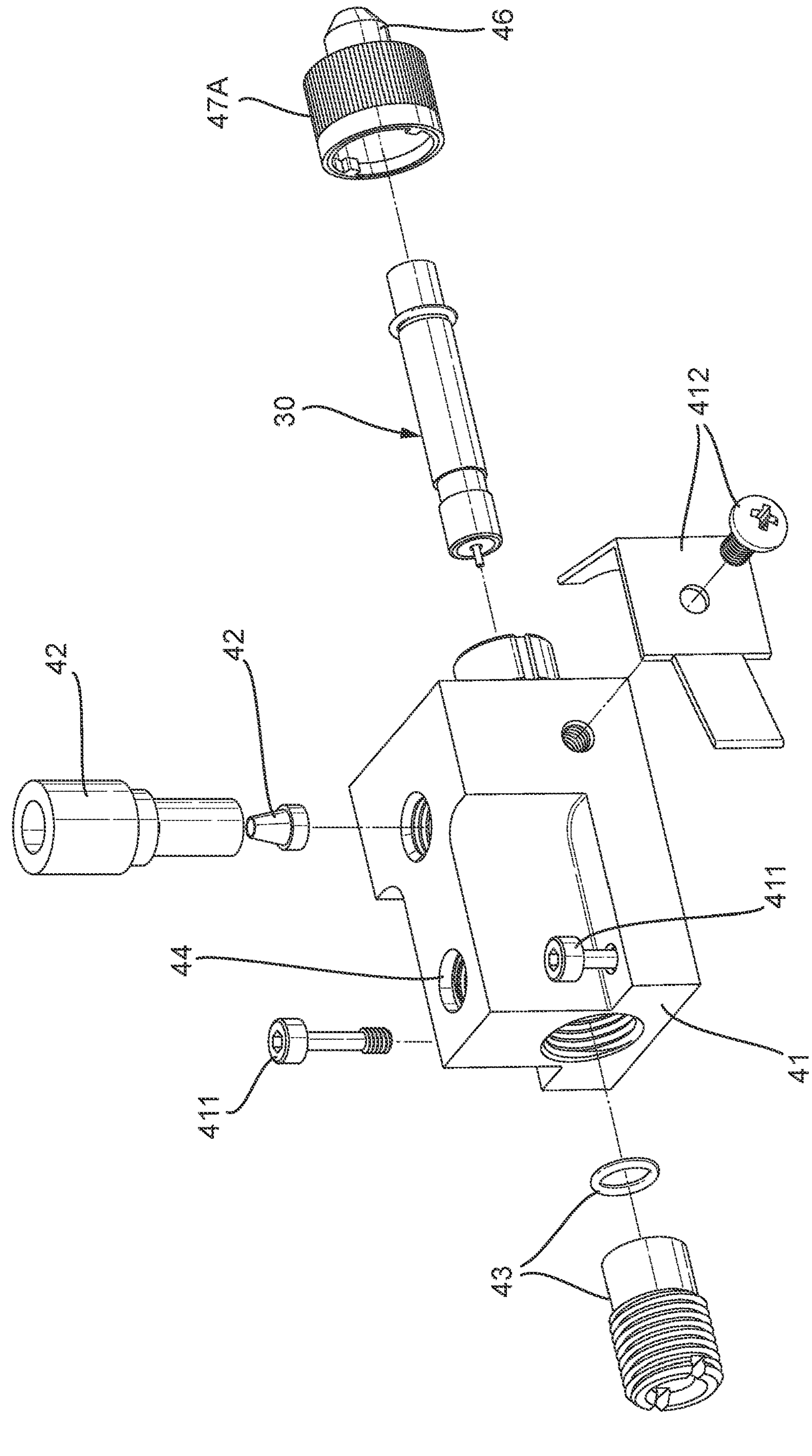
FIG. 4B is an exploded view of the sprayer assembly.
Figure 4C:
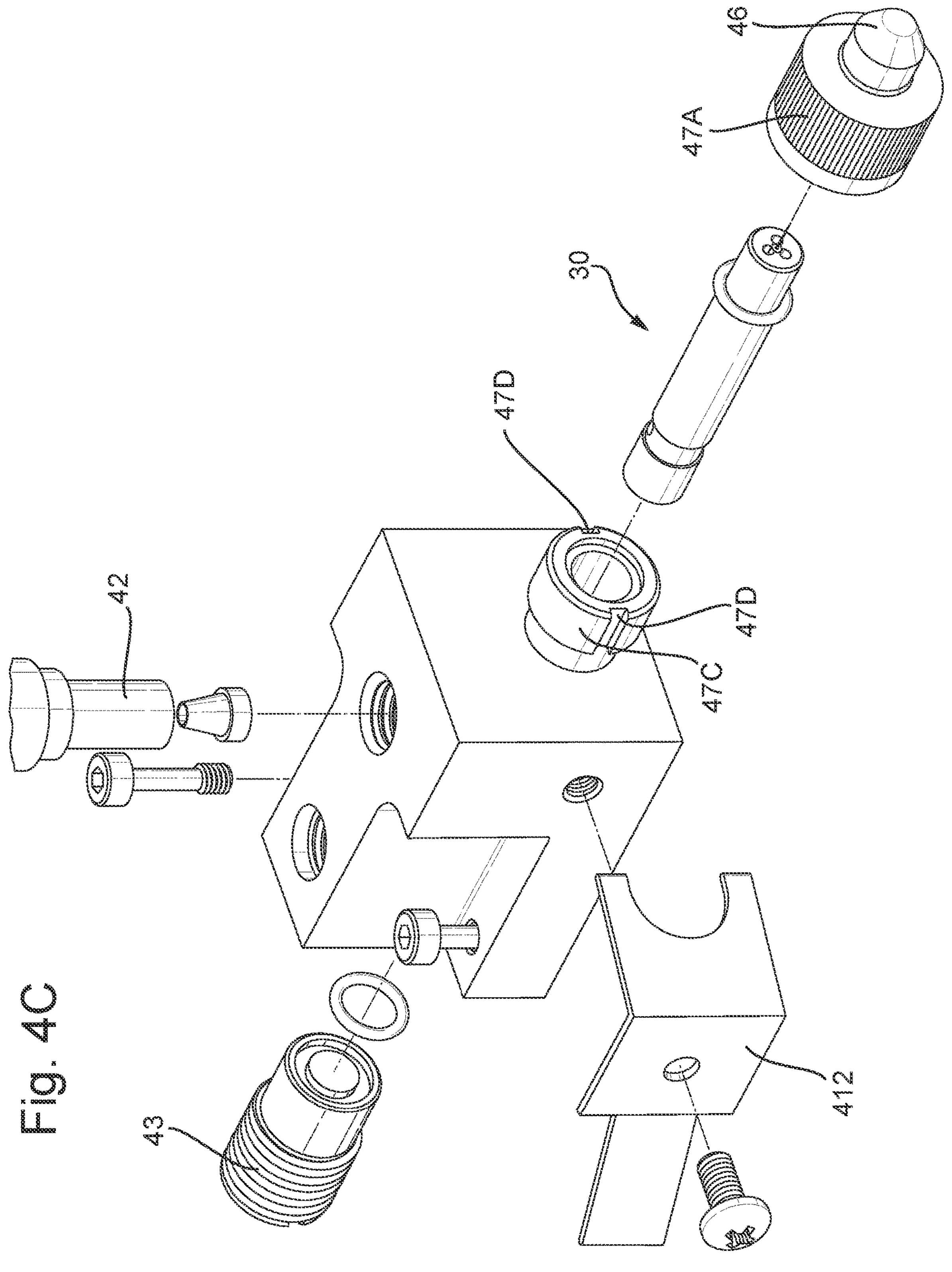
FIG. 4C is an exploded view of the sprayer assembly.

FIGS. 4B and 4C show exploded views of the assembly comprising the cartridge assembly 30 and manifold body 41. As can be seen in these Figures, the assembly may include one or more fasteners for attaching the manifold body 41 to (the rest of) and analytical instrument, for example in the form of one or more screws 411, which may be captive to the manifold body 41.

In embodiments, as can be seen in FIG. 4A-C, the capillary outlet 32A is positioned behind a removable nozzle 46. The removable nozzle 46 may have an aperture, wherein the capillary 32 may be arranged to direct a spray of solvent droplets through the aperture.

The nozzle 46 may take any suitable form as desired. In embodiments, the nozzle may have a generally conical or frustoconical shape. The aperture of the nozzle may generally circular in shape and may be positioned centrally, that is, located on a central axis of the nozzle.

The size of the aperture provided within the nozzle 46 may be selected as desired, for example depending on the desired spot size and the diameter of the capillary 32. Smaller spot sizes can be used to produce higher (spatial) resolution data, but provide less sensitivity. Larger spot sizes can be used to achieve greater sensitivity, but have lower (spatial) resolution.

In embodiments, the diameter of the aperture may range from about 10 microns to about 250 microns. For example, the diameter of the aperture may range from about: (i) 50 microns to about 250 microns; (ii) 100 microns to about 250 microns; (iii) 150 microns to about 250 microns; or (iv) 175 microns to about 250 microns. Although smaller apertures generally produce sprays with an initially smaller diameter, sprays produced from smaller apertures also suffer from greater divergence. The inventors have found that a nozzle diameter of about 200 microns can produce particularly reproducible sprays.

The nozzle 46 may be maintained at ground potential. Thus, the assembly may further comprise a device for grounding the nozzle 46, for example in the form of a grounding clip 412. However, it is also contemplated that the nozzle 46 may be charged. For example, a voltage may be provided to the nozzle 46 to charge (or further charge) the solvent spray as it passes through the nozzle 46 (for example, instead of, or in addition to, applying a voltage to the capillary 32). A voltage applied to the nozzle 46 may also be used to direct (or focus) the solvent spray as it passes through the nozzle.

The sprayer assembly may be capable of producing a fine spray of solvent droplets, for example having a beam width of less than 50 μm at a distance of 1.5 mm from the front surface of the nozzle 46.

As described above, in various embodiments the assembly is configured such that installing the nozzle 46 causes the sheath 31 to move relative to the capillary 32 to the second exposed position, and removing the nozzle 46 causes the sheath 31 to move relative to the capillary 32 to the first protective position.

For example, with reference to FIG. 4, the assembly may be configured such that removal of the nozzle 46 causes the compression spring 33 to unload, and in doing so push the sheath 31 to extend over the outlet (solvent-emitting tip) 32A of the capillary 32, to thereby protect the capillary 32 from damage. Conversely, when the nozzle 46 is installed, the nozzle 46 may push the sheath 31 so that the sheath 31 retracts to the exposed position, and the compression spring 33 is compressed. The sheath may then be held in the retracted position by connecting the nozzle 46 to the manifold body 41. This then means that the capillary outlet (tip) 32A can be protected by the sheath 31 when the nozzle 46 is removed, and the sheath 31 can retract to allow normal use when the nozzle 46 is installed.

As can be seen in FIG. 4A, the assembly may be configured such that when the capillary 32 and nozzle 46 are installed, the capillary 32 and nozzle 46 are arranged coaxially with respect to one another, such that the outlet (tip) 32A of the capillary 32 is aligned with (located in line with) the aperture 46C of the nozzle 46. The inventors have found that the spray can be particularly sensitive to the alignment (centering) of the outlet (solvent-emitting tip) 32A of the capillary 32 with the aperture 46C of the nozzle 46, and that therefore spray reproducibility can be improved by ensuring that the alignment (centering) between the nozzle aperture 46C and capillary outlet (tip) 32A is highly reproducible.

This can be achieved in any suitable manner. In embodiments, the assembly is configured with a nozzle guide that guides the nozzle 46 into coaxial alignment with the capillary outlet (tip) 32A when the nozzle 46 is installed. This can help to ensure that the aperture 46C of the nozzle 46 is positioned centrally and reproducibly with respect to the outlet (tip) 32A of the capillary 32.

Figure 4D:
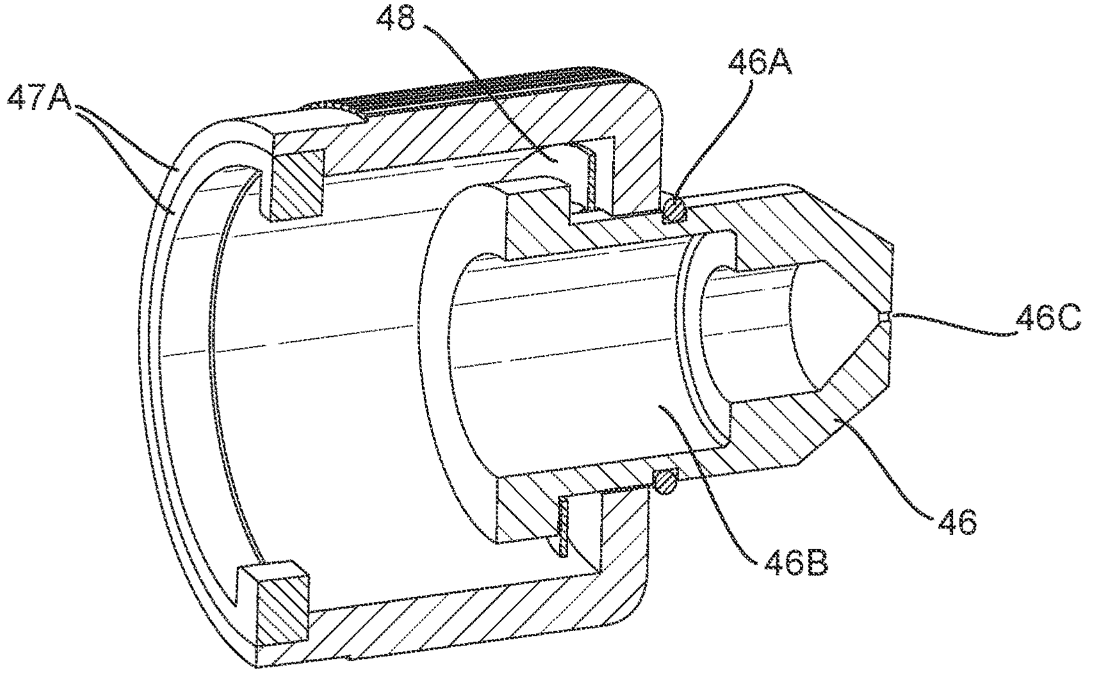
FIG. 4D shows a cross-section of a sprayer nozzle according to various embodiments.
Figure 4E:
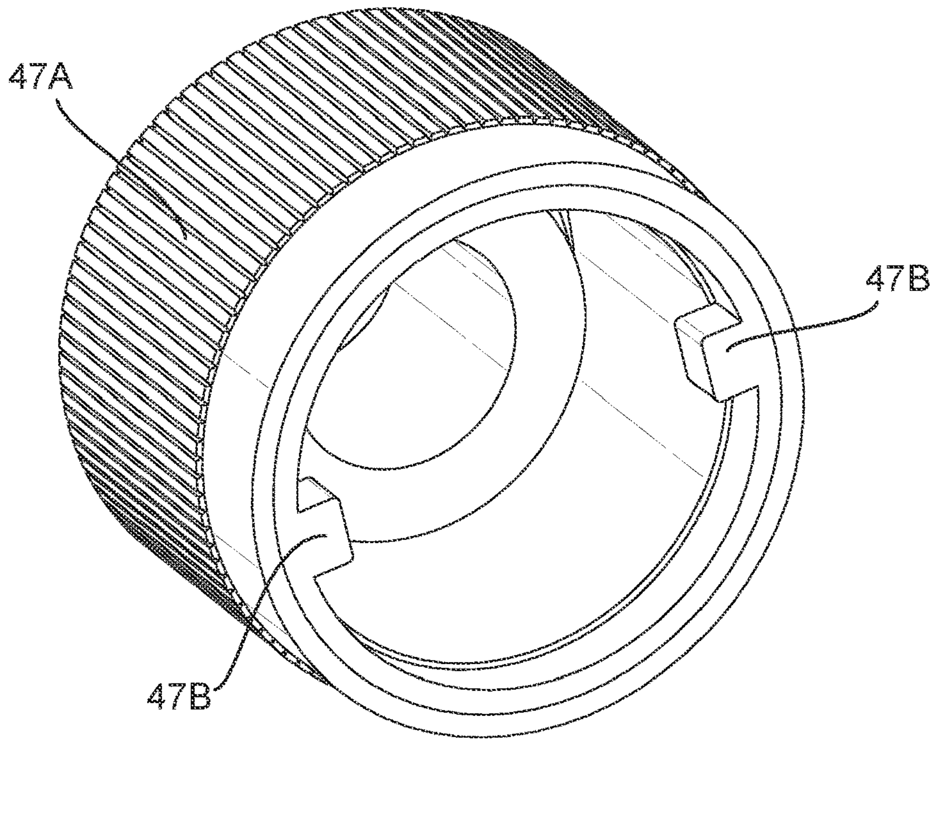
FIG. 4E shows a sprayer nozzle according to various embodiments.

For example, as can be best seen in FIGS. 4A and 4D, the nozzle 46 may comprise a rear bore 46B configured to fit coaxially over an end (the outlet end) of the sheath 31. The bore and sheath end may each be generally cylindrical, but other shapes would be possible. As described above, the capillary 32 may be provided in a central axial bore 31A provided in the sheath 31, and the nozzle aperture 46C may be located on a central axis of the nozzle 46, such that the capillary outlet 32A and nozzle aperture 46C are aligned when the rear bore 46B is fitted coaxially over the end of the sheath 31.

Thus, in various embodiments, installing the nozzle 46 involves sliding the rear nozzle bore 46B over the end of the sheath 31. When the nozzle bore 46B is fully over the end of the sheath 31, further pressure applied to the nozzle 46 may cause the sheath 31 to retract from the protective position to the exposed position. A connector may connect the nozzle 46 to the manifold body 41, such that the sheath 31 is retained in the retracted (exposed) position for use.

The nozzle connector may comprise a screw connector. This arrangement can allow toolless installation and removal of the sprayer assembly.

The inventors have recognised, however, that the spray can be particularly sensitive to the distance between the nozzle aperture 46C and the solvent-emitting outlet 32A of the capillary. For example, it has been found that maintaining the solvent-emitting outlet 32A of the capillary at a distance of about 0.5 mm behind the nozzle aperture 46C can improve properties spray of the spray.

The inventors have furthermore recognised that a risk exists with screw connectors of a user not fully screwing the connector into position. As such, the use of a screw connector may increase the chance of variations in nozzle aperture to capillary outlet distance, and so may be associated with a degradation of spray reproducibility.

In various embodiments, the nozzle connector is a bayonet connector. A bayonet connector may also be referred to as a "¼ turn" and/or "BNC" connector. The inventors have found that the use of such a connector can reduce the risk of variations in nozzle aperture to capillary outlet distance, and so can improve spray reproducibility, for example as compared to a screw connector.

FIGS. 4A-E illustrate a bayonet connector according to various embodiments. As can be seen most clearly in FIG. 4E, the nozzle 46 may be provided as part of a nozzle assembly that includes a male connector comprising a barrel 47A, and two tabs 47B projecting radially inwardly from a rear of the barrel 47A.

As can be seen most clearly in FIG. 4C, the manifold body 41 may comprise a complementary female connector comprising a body 47C having two grooves 47D which are complementary to the two tabs 47B.

A connection may be made by pushing the barrel 47A over the connector body 47C, with the tabs 47B aligned to, and passing along, the grooves 47D. Then, when the tabs 47B reach beyond a rear surface of the connector body 47C, the barrel 47A may be rotated (for example by a ¼ turn (90 degrees)) so that the tabs 47B can engage the rear surface of the connector body 47C.

FIG. 4D shows the nozzle assembly of the present embodiment in more detail. The nozzle assembly comprises a nozzle 46 and nozzle connector barrel 47A. The nozzle may be held captive to the barrel 47A, for example between a nozzle retaining clip 46A provided on the nozzle 46, and a spring washer 48.

Providing the nozzle and nozzle connector as separate elements allows the nozzle to be interchangeably replaced, without necessarily having to replace the nozzle connector. However, it is also contemplated that the nozzle and nozzle connector may be integrated.

As can be seen in FIG. 4A, when the nozzle 46 is connected to the manifold body 41, the nozzle 46 may be held in position between a front face of the connector body 47C and the spring washer 48. The inventors have found that this arrangement can allow a highly reproducible capillary outlet to nozzle aperture distance to be achieved.

Figure 5A:
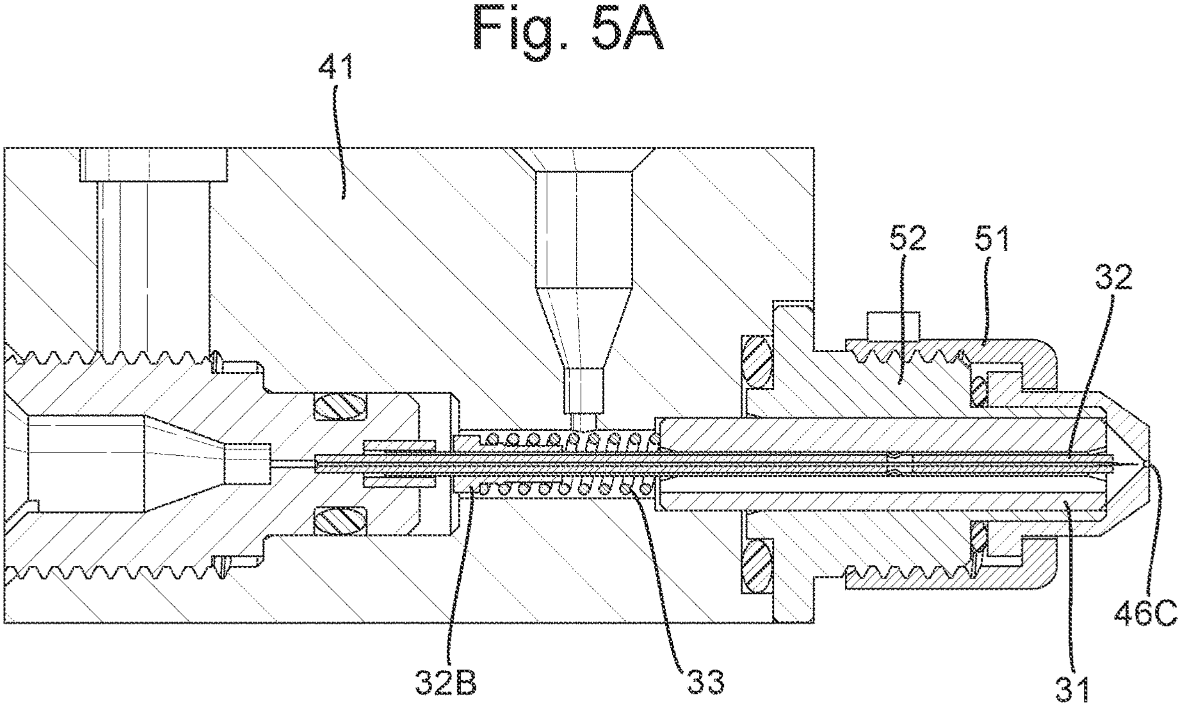
FIG. 5A shows a cross-section of a sprayer assembly according to various embodiments.
Figure 5B:
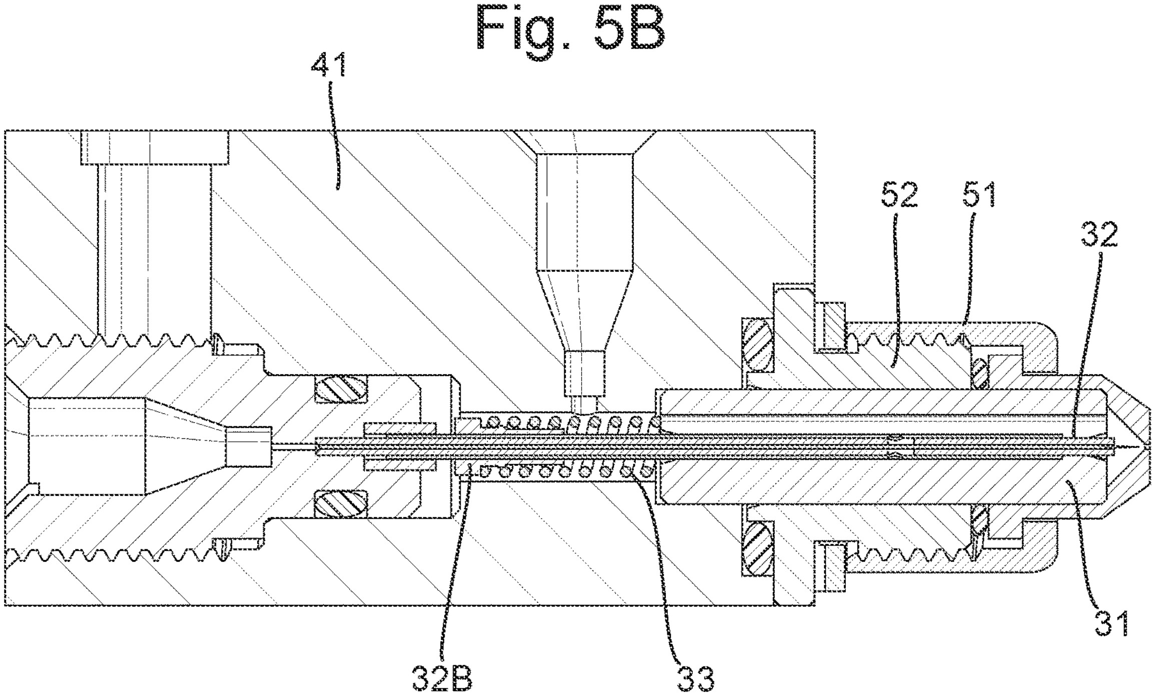
FIG. 5B shows a cross-section of a sprayer assembly according to various embodiments.
Figure 6A:
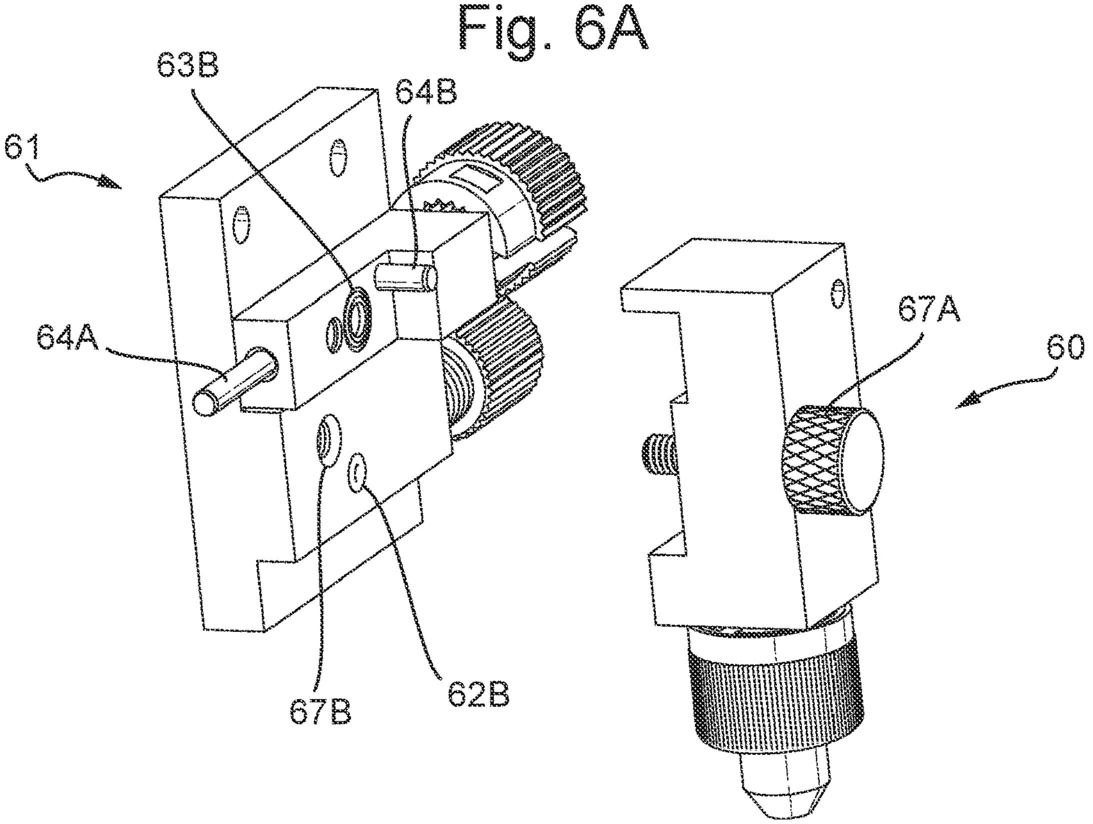
FIG. 6A shows a sprayer assembly according to various embodiments.
Figure 6B:
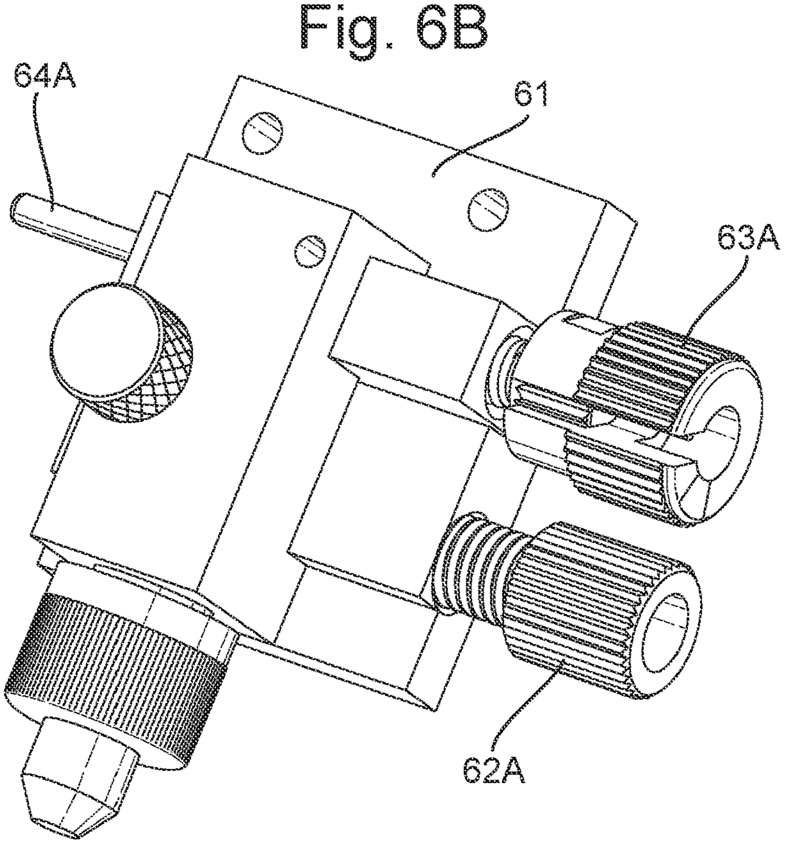
FIG. 6B shows a sprayer assembly according to various embodiments.
Figure 6C:
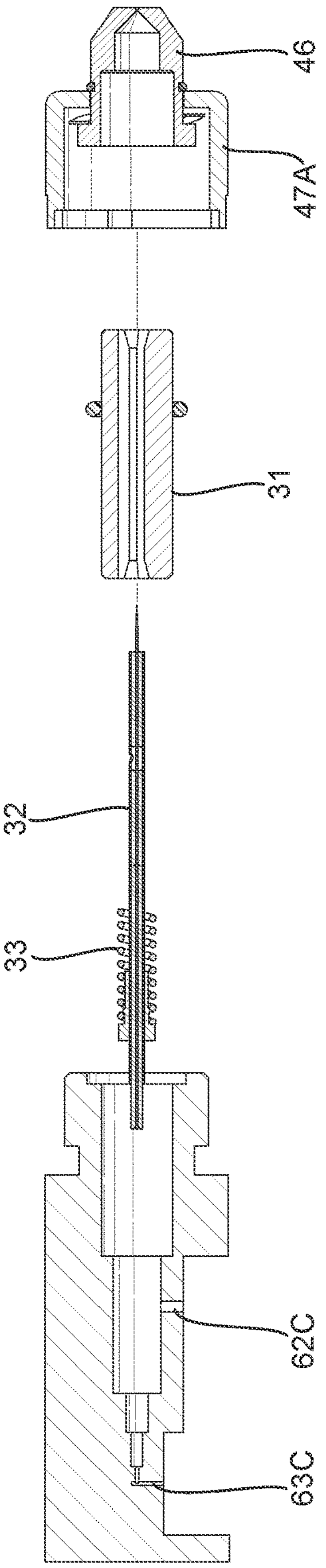
FIG. 6C shows a cross-section of a sprayer assembly according to various embodiments.
Figure 6D:
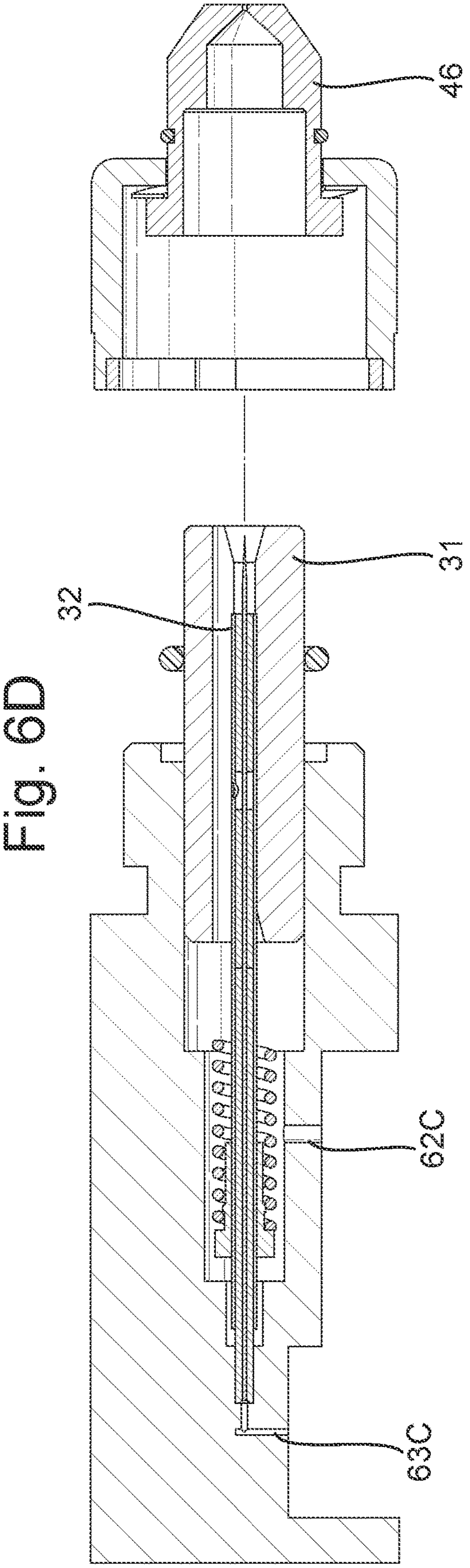
FIG. 6D shows a cross-section of a sprayer assembly according to various embodiments.
Figure 6E:
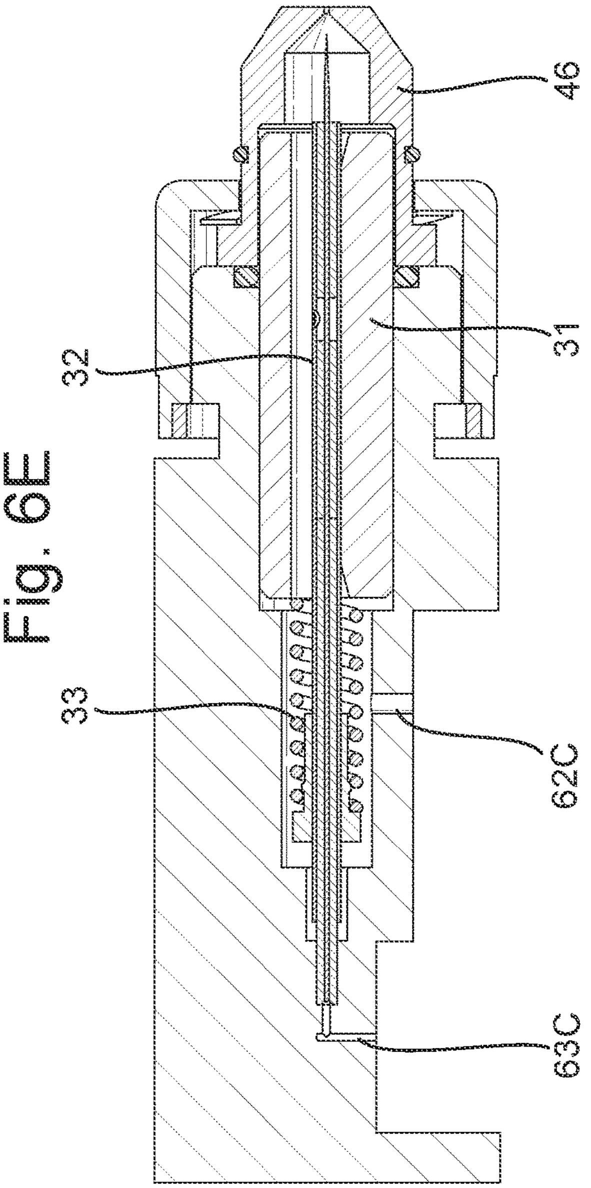
FIG. 6E shows a cross-section of a sprayer assembly according to various embodiments.
Figure 7A:
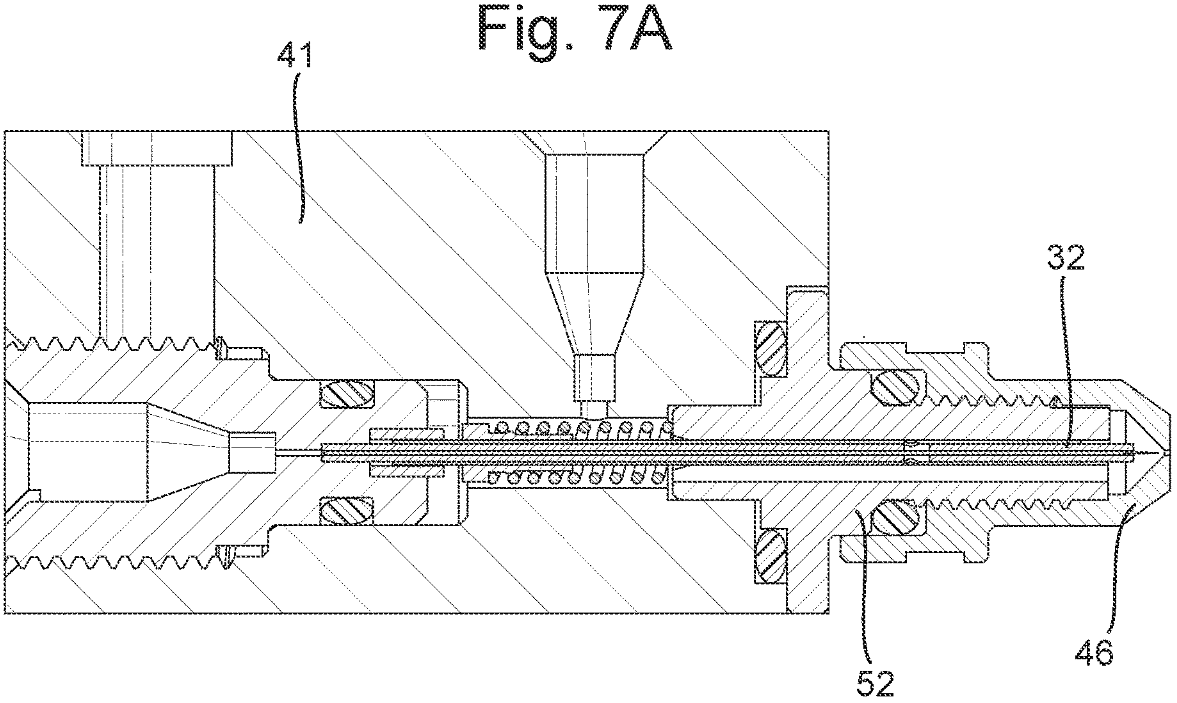
FIG. 7A shows a cross-section of a sprayer assembly according to various embodiments.
Figure 7B:
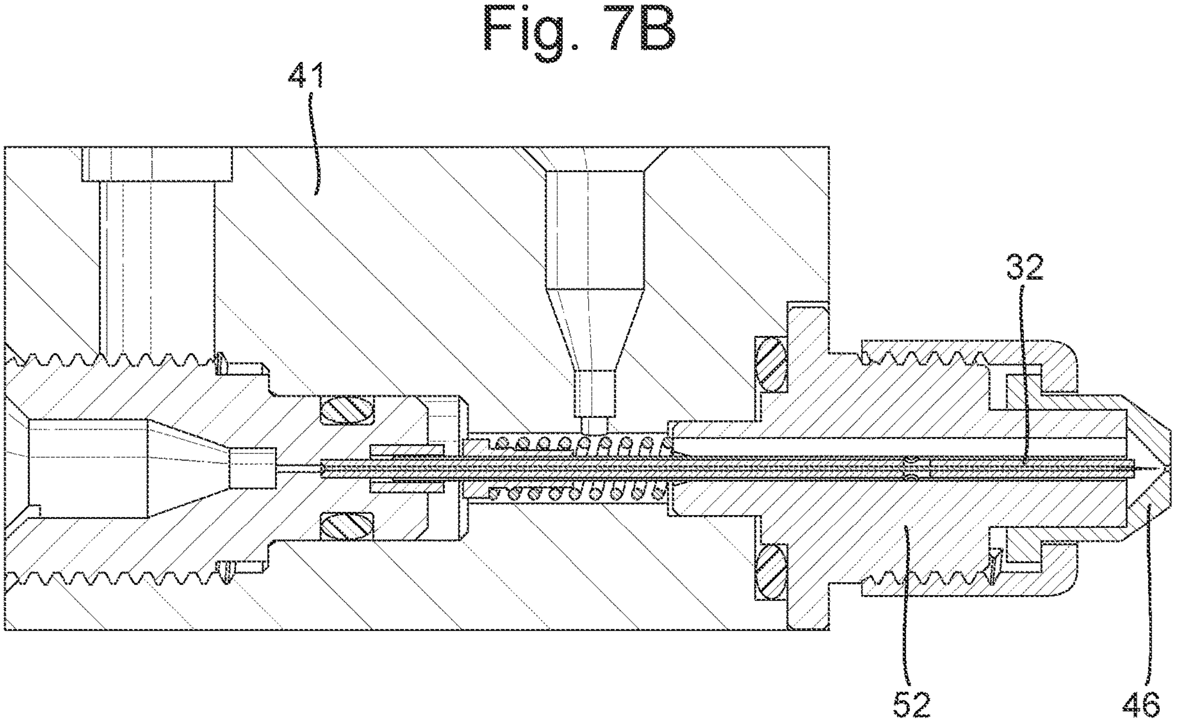
FIG. 7B shows a cross-section of a sprayer assembly according to various embodiments.

Various alternative embodiments are illustrated in FIGS. 5 to 7.

Although in embodiments described above, the compression spring 33 is provided within a cavity 31B in the sheath 31, FIGS. 5 and 6 show embodiments in which the compression spring 33 is provided externally to the sheath 31. As can be seen in FIGS. 5 and 6, in these embodiments, the compression spring 33 may be compressed between a collar 32B provided on the capillary and an (external) end of the sheath 31.

Although in embodiments described above, an end of the retractable sheath 31 acts as a nozzle guide to guide the nozzle 46 into coaxial alignment with the capillary 32, FIGS. 5A and 7 show embodiments in which a nozzle support 52 acts as the nozzle guide. For example, FIG. 7 illustrates embodiments wherein a nozzle support 52 is configured to guide the nozzle 46 into coaxial alignment with the capillary 32 when the nozzle 46 is installed. In the embodiment of FIG. 5A, a nozzle support 52 surrounding a retractable sheath 31 acts as the nozzle guide. In these embodiments, the nozzle support 52 is configured to retain the capillary 32 and/or sheath 31 centrally to the nozzle support 52, such that when the nozzle 46 is attached to the nozzle support 52, the nozzle aperture 46C is aligned with the capillary outlet 32A.

Although in embodiments described above, the nozzle 46 is connected with a bayonet connector, FIGS. 5 and 7 show embodiments in which the nozzle connector is a screw connector. For example, as can be seen in FIG. 5, a cap 51 having a screw thread that is configured to be attached to a complementary screw thread on the nozzle support 52 may be provided.

Although in embodiments described above, the nozzle 46 is separable from the nozzle connector, FIG. 7A shows an embodiment where the nozzle and connector are integrated.

Although in embodiments described above, the sheath 31 can be inserted into the manifold body 41 as a cartridge and retained there by connecting the nozzle 46 to the manifold body 41, FIG. 6 shows an embodiment where a sprayer assembly 60 is removably attachable to a manifold assembly 61. In this embodiment, the sprayer assembly 60 includes one or more fasteners for removably mounting the sprayer assembly 60 to the manifold assembly 61, which may be in the form of one or more captive screw connectors 67A, 67B.

In various embodiments, the manifold assembly 61 is configured with various input ports, which may be coupled to the sprayer assembly 60 when the sprayer assembly 60 is connected to the manifold assembly 61.

Thus, as can be seen in FIG. 6, the manifold assembly 61 may include an input solvent port 63A for receiving an input solvent flow, and a solvent output comprising fluid seal 63B for providing the solvent to a solvent input 63C of the sprayer assembly 60 when the sprayer assembly 60 and manifold assembly 61 are connected.

The manifold assembly 61 may further include an input gas port 62A for receiving an input gas flow, and a gas output comprising gas seal 62B for providing the gas to a gas input 62C of the sprayer assembly 60 when the sprayer assembly 60 and manifold assembly 61 are connected.

The manifold assembly 61 may further include an input high voltage pin 64A for receiving an input high voltage, and an output high voltage pin 64B for providing the high voltage to a high voltage input (not shown) of the sprayer assembly 60 when the sprayer assembly 60 and manifold assembly 61 are connected.

FIGS. 6C-E show cross section views of the sprayer assembly 60 of the present embodiment. FIG. 6C is an exploded view of the sprayer assembly 60, FIG. 6D shows the sprayer assembly 60 with the nozzle 46 removed and the sheath 31 positioned in the protective position, and FIG. 6E shows the sprayer assembly 60 with the nozzle 46 attached and the sheath 31 in the retracted (exposed) position.

As described above, the inventors have recognised that the spray can be particularly sensitive to the distance between the nozzle aperture 46C and the solvent-emitting outlet 32A of the capillary. Thus, in some embodiments (as described above), it can be desirable to configure the sprayer assembly such that variations in the nozzle aperture to capillary outlet distance are reduced or minimised.

An alternative approach is to configure the sprayer assembly such that (in use) the nozzle aperture to capillary outlet distance is adjustable in a controllable manner. In other words, the sprayer assembly may be configured such that a user can (controllably) adjust the nozzle aperture to capillary outlet distance (in use), in order to achieve desired spray properties. This means that the nozzle aperture to capillary outlet distance can be precisely set to a desired value, and/or can allow manufacturing tolerances of the sprayer assembly to be relaxed without introducing uncontrolled variation in the nozzle aperture to capillary outlet distance.

Thus, in various embodiments, the sprayer assembly is configured such that the distance between the nozzle aperture 46C and the capillary outlet 32A is adjustable (when the sprayer assembly is in use). The distance between the nozzle aperture 46C and the capillary outlet 32A may be adjustable in a controllable manner, that is, such that when the distance between the nozzle aperture 46C and the capillary outlet 32A is set (by a user) at a particular value, the distance between the nozzle aperture 46C and the capillary outlet 32A remains at that particular value (when the sprayer assembly is used to produce a spray).

The sprayer assembly may be configured such that the distance between the nozzle aperture 46C and the capillary outlet 32A is controllably adjustable in any suitable manner. For example, in various particular embodiments, part of all of the rear surface of the connector body 47C (as described above with reference to FIG. 4C) may be sloped (inclined) and/or curved with respect to the (vertical) front surface of the connector body 47C.

Figure 8:
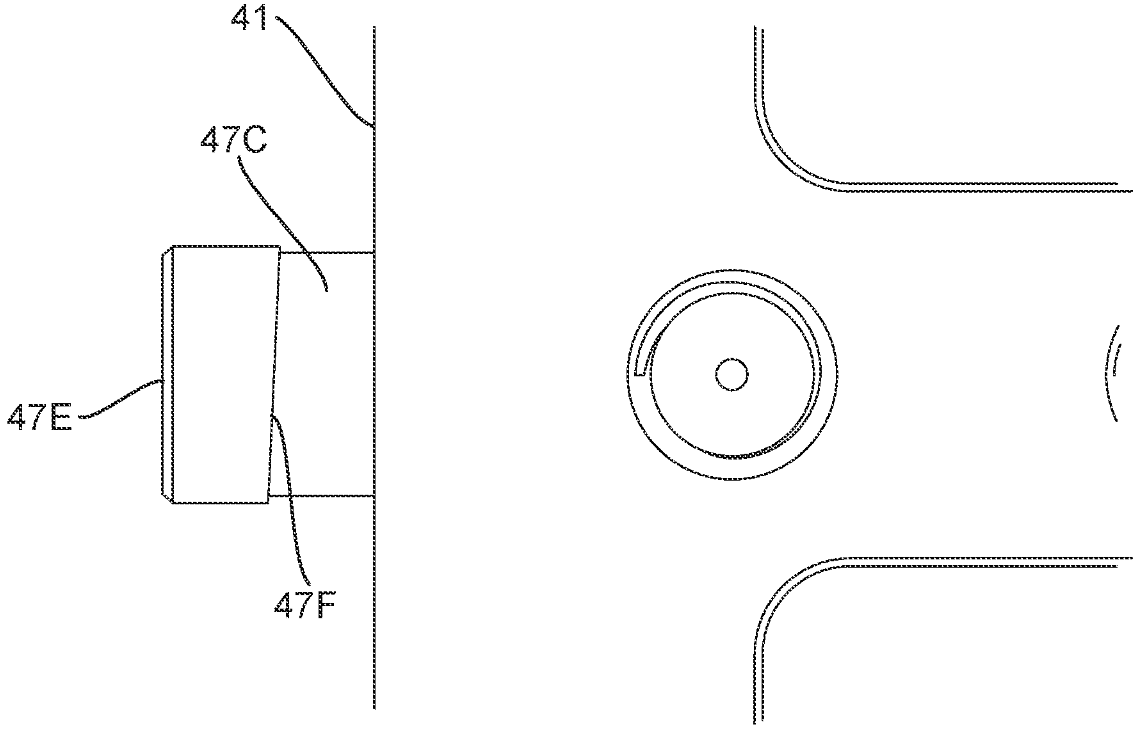
FIG. 8 shows a side view of a manifold body of a sprayer assembly according to various embodiments.

FIG. 8 shows a side-on view of the manifold body 41 and the connector body 47C configured in accordance with these embodiments. As shown in FIG. 8, the manifold body 41 and the connector body 47C may be configured in a similar manner to that described above. As such, a first (distal, front) surface 47E of the connector body 47C may be parallel with a (front) face of the manifold body 41 (which surfaces may be configured to be generally vertical in use). The connector body 47C also has a second (rear) surface 47F which is configured to engage with the tabs 47B of the barrel 47A of the nozzle assembly when the nozzle assembly is installed on the manifold body 41 (as described above).

In contrast with the embodiments described above, however, the second (rear) surface 47F of the connector body 47C may be non-parallel with the first surface 47E (and with the face of the manifold body 41), for example such that the second surface 47F is sloped, inclined, and/or generally non-vertical in use. It would also be possible for the second surface 47F to have a curved shape such as a cam-shape. When the nozzle assembly is installed on the connector body 47C (as described above), the tabs 47B will engage the second surface 47F (due to the force from the compression spring 33), such that when the barrel 47A is rotated, the distance between the nozzle aperture 46C and the capillary outlet 32A will be controllably changed.

Various other configurations for the sprayer assembly would be possible such that the distance between the nozzle aperture 46C and the capillary outlet 32A is controllably adjustable.

In embodiments, the distance between the nozzle aperture 46C and the capillary outlet 32A may be adjustable by any suitable (relatively small) amount. For example, in embodiments, the distance between the nozzle aperture 46C and the capillary outlet 32A may be adjustable by around ≤500 μm; ≤400 μm; ≤300 μm; ≤200 μm; or ≤100 μm.

In various particular embodiments, the second surface 47F is angled such that a maximum rotation of the barrel 47A (for example through around 180°) causes the distance between the nozzle aperture 46C and the capillary outlet 32A to be adjusted by around 200 μm.

Figure 9A:
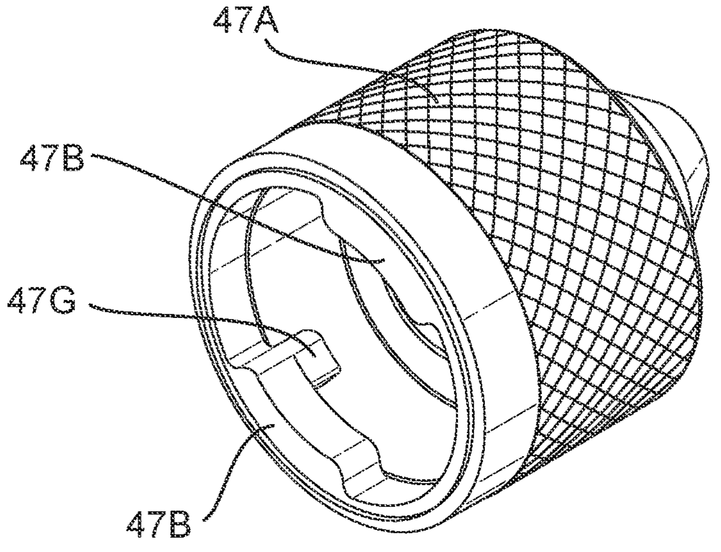
FIG. 9A shows a perspective rear view of a sprayer nozzle according to various embodiments.
Figure 9B:
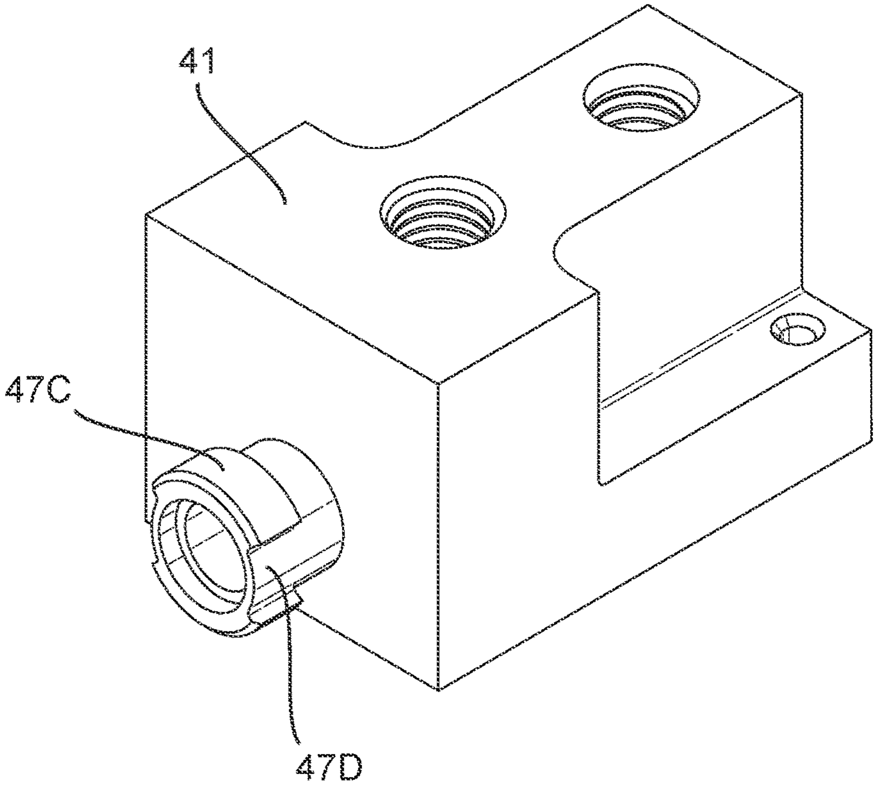
FIG. 9B shows a perspective view of a manifold body of a sprayer assembly according to various embodiments.

FIGS. 9A and 9B show a sprayer assembly configured in accordance with further embodiments. In these embodiments, in addition to the one or more tabs 47B, the nozzle assembly may include one or more stops (or “flags”) 47G. The stop(s) 47G may project axially inwardly from a rear of the barrel 47A.

The stop(s) 47G may be configured to limit rotation of the barrel 47A when the nozzle assembly is installed on the manifold body 41. For example, the stop 47G may be configured such that interaction of the stop 47G with an inner wall of one or more of the grooves 47D (as described above) prevents rotation of the barrel 47A beyond a certain maximum rotation angle. Such a stop 47G can be provided in any of the embodiments described above, for example in relation to FIGS. 4A-E and/or FIG. 8, in order to precisely limit rotational movement of the barrel 47A when the barrel 47A is installed on the manifold body 41.

Although as shown above, particularly in FIGS. 4A and 4D, the rear bore 46B of the nozzle 46 (and the outlet end of the sheath 31) may have a generally cylindrical shape, the inventors have found that different shapes may provide improved alignment (centering) of the outlet (solvent-emitting tip) 32A of the capillary 32 with the aperture 46C of the nozzle 46.

Figure 10:
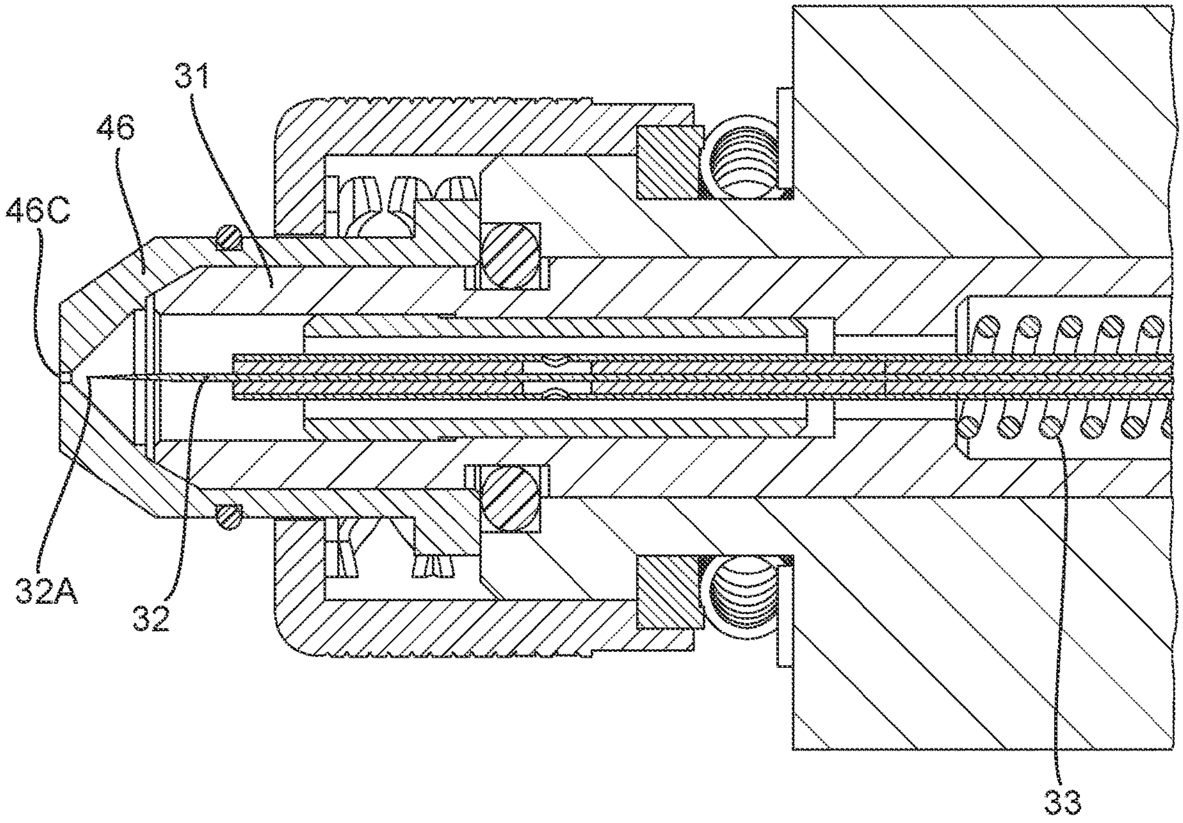
FIG. 10 shows a cross-section of a sprayer assembly according to various embodiments.

For example, as shown in FIG. 10, (at least part of) the rear bore 46B of the nozzle 46 may have a conical or frustoconical shape, and the outlet end of the sheath 31 may have a complimentary conical or frustoconical shape. In these embodiments, interaction of the (frusto)conical outer surface of the outlet end of the sheath 31 with the (frusto) conical inner surface of the rear bore 46B of the nozzle 46 (due to the force of the compression spring 33 when the nozzle 46 is installed on the sheath 31) causes the outlet (solvent-emitting tip) 32A of the capillary 32 (which is retained by the sheath 31) to come into concentric alignment with the aperture 46C of the nozzle 46. This arrangement has been found to significantly improve the concentric alignment of the emitter and nozzle aperture.

Although as described above (with reference to FIGS. 3A to 3E), the sheath 31 may be formed as a single part having an axial bore 31A, 31B, and one or more gas conduits 36C that may run along the length of and parallel with part of the axial bore, in further embodiments, the sheath 31 may be formed from plural parts. This may, for example, increase ease of manufacturability of the sheath 31. For example, this may allow one or more of the plural parts to be formed by injection moulding.

Figure 11A:
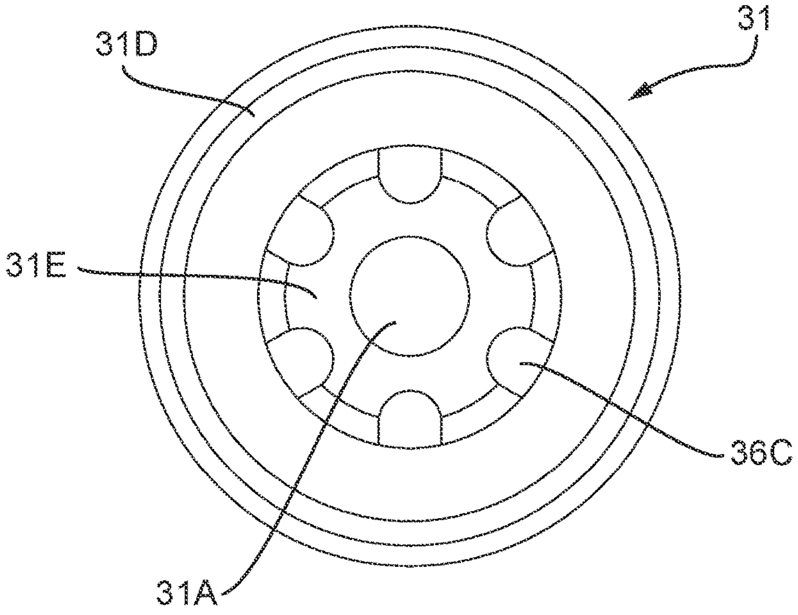
FIG. 11A shows an end view of a sheath of a sprayer assembly according to various embodiments.
Figure 11B:
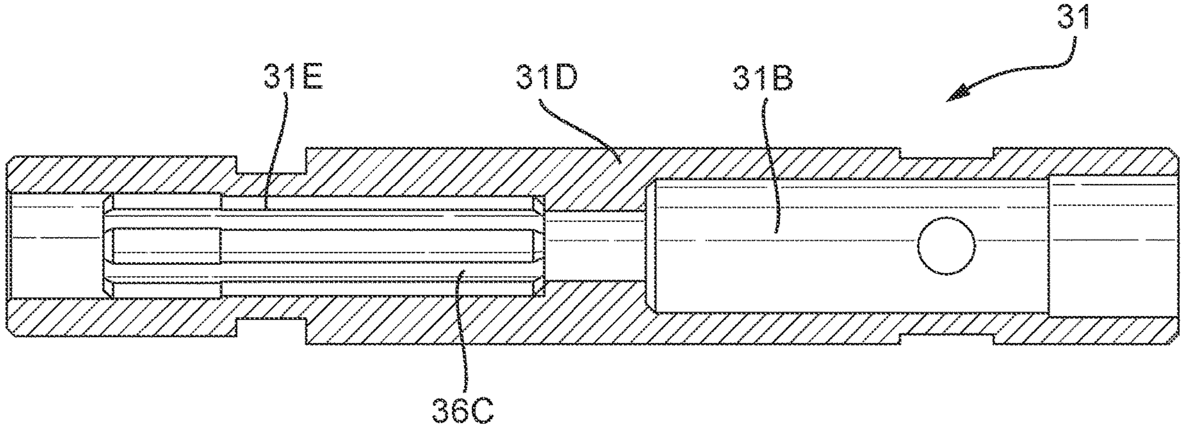
FIG. 11B shows a cross-section of a sheath of a sprayer assembly according to various embodiments.

FIG. 11A shows an end-on view, and FIG. 11B shows a side cross-sectional view of a sheath 31 configured in accordance with these embodiments. As shown in FIGS. 11A and 11B, the sheath 31 may be formed from an (outer) main sheath body 31D, and a sheath insert 31E. The axial bore of the main sheath body 31D may be configured to receive and retain the sheath insert 31E. One or both of the main sheath body 31D and the sheath insert 31E may be formed by injection moulding.

In these embodiments, the second axial segment or cavity 31B may be formed in the main sheath body 31D (similarly to the embodiments described above), but the first axial segment 31A (that is configured and dimensioned to retain the capillary 32) and the one or more gas conduits 36C may be formed in the sheath insert 31E.

Thus, the sheath insert 31E may comprise a central axial bore 31A (that is configured and dimensioned to retain the capillary 32) and one or more gas conduits 36C. As shown in FIGS. 9A and 9B, the one or more gas conduits 36C may be formed as one or more (open-sided) trenches in the sheath insert 31E. It would also be possible for one or more of the one or more gas conduits 36C to be formed as a bore in the sheath insert 31E.

Other arrangements would be possible.

In various embodiments, a spray of charged droplets produced by a sprayer assembly as described above is directed towards a sample. The spray may desorb analyte material from the surface of the sample, and the desorbed material may then be transported to an analytical instrument, such as a mass and/or ion mobility spectrometer, for analysis. Ions may then be analysed to determine their mass to charge ratio and/or ion mobility, and/or to determine the mass to charge ratio and/or ion mobility of ions derived from the initial ions (for example by fragmenting the initial ions), and so on.

Although the examples described above relate to particularly to desorption electrospray ionisation (“DESI”) systems, it will be appreciated that the features described herein may in general relate to various types of (ambient) ion sources. For instance, various DESI-derived techniques have been developed and the techniques presented herein may be applied equally to these.

Although the present invention has been described with reference to preferred embodiments, it will be understood by those skilled in the art that various changes in form and detail may be made without departing from the scope of the invention as set forth in the accompanying claims.

The invention claimed is:

1. A sprayer assembly comprising:
- a sprayer assembly body; and
- a cartridge housing a capillary having an outlet configured to emit liquid; wherein the cartridge comprises:
  - a sheath for the capillary; and
  - an elastic member;
  - wherein the cartridge is configured such that the sheath can move relative to the capillary between a first position in which the sheath covers the outlet of the capillary and a second position in which the outlet of the capillary is uncovered by the sheath; and
  - wherein the cartridge is configured such that, during use, as the sheath moves from the first position to or towards the second position, the elastic member provides a restoring force that acts to restore the position of the sheath to or towards the first position;
- the sprayer assembly further comprising:
  - a nozzle that is removably attachable to the sprayer assembly body;
  - wherein the nozzle comprises an aperture; and
  - wherein the sprayer assembly is configured such that attaching the nozzle to the sprayer assembly body can retain the cartridge within the sprayer assembly body such that the liquid emitted from the outlet of the capillary will be directed through the aperture of the nozzle.

2. The sprayer assembly of claim 1, wherein the elastic member is retained in a cavity within the sheath.

3. The sprayer assembly of claim 1, wherein the elastic member comprises a compression spring.

4. The sprayer assembly of claim 1, wherein:

the sheath comprises one or more gas inlets, one or more gas outlets, and one or more gas conduits that connect the one or more gas inlets to the one or more gas outlets; and the cartridge is configured such that gas provided to the one or more gas inlets is emitted from the one or more gas outlets so as to nebulise the liquid emitted from the outlet of the capillary.

5. The sprayer assembly of claim 4, wherein:

the sheath comprises an axial bore configured to retain the capillary; and the one or more gas conduits are each arranged to be parallel to the axial bore.

6. The sprayer assembly of claim 1, wherein the sprayer assembly body comprises a bore configured to receive the cartridge.

7. The sprayer assembly of claim 1, wherein the sprayer assembly is configured such that the distance between the aperture of the nozzle and the outlet of the capillary is adjustable.

8. The sprayer assembly of claim 1, wherein the sprayer assembly is configured such that attaching the nozzle to the sprayer assembly body causes the sheath to move to the second position and such that removing the nozzle from the sprayer assembly body causes the sheath to move to the first position.

9. The sprayer assembly of claim 1, wherein the sprayer assembly is configured such that the nozzle pushes the sheath to the second position when the nozzle is attached to the sprayer assembly body.

10. The sprayer assembly of claim 1, wherein the sheath is configured as a nozzle guide, such that when the nozzle is attached to the sprayer assembly body the nozzle guide guides the nozzle into coaxial alignment with the capillary.

11. The sprayer assembly of claim 1, wherein:

the sprayer assembly body comprises one or more supply ports; and the sprayer assembly is configured such that the one or more supply ports are coupled to one or more corresponding ports of the cartridge when the cartridge is retained within the sprayer assembly body.

12. The sprayer assembly of claim 1, wherein the nozzle is attachable to the sprayer assembly body by a screw or bayonet fitting.

13. The sprayer assembly of claim 12, wherein the nozzle is removable from the screw or bayonet fitting.

14. An ion source comprising the sprayer assembly of claim 1.

15. A method of producing a spray of droplets comprising using the sprayer assembly of claim 1 to produce the spray of droplets.

* * * * *